US007162695B2

(12) United States Patent
Zemore et al.

(10) Patent No.: US 7,162,695 B2
(45) Date of Patent: Jan. 9, 2007

(54) SAFETY ANALYSIS TRAINING DEVICE

(75) Inventors: Michael G. Zemore, Fredericksburg, VA (US); Robert C. Heflin, Jr., Fredericksburg, VA (US); Kenneth B. Johnson, Waldorf, MD (US); T. Glenn Moore, Fredericksburg, VA (US); Joseph T. Janney, Fredericksburg, VA (US); Peggy L. Rogers, King George, VA (US); Kevin G. Stottlar, Fredericksburg, VA (US); Lawrence E. Eskey, Jr., King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 778 days.

(21) Appl. No.: 10/172,252

(22) Filed: Jun. 17, 2002

(65) Prior Publication Data
US 2003/0231200 A1 Dec. 18, 2003

(51) Int. Cl.
*G06F 3/00* (2006.01)
*G06F 3/01* (2006.01)
(52) U.S. Cl. ...................... 715/709; 715/530
(58) Field of Classification Search ............... 345/148; 702/179; 715/709, 764
See application file for complete search history.

(56) References Cited

U.S. PATENT DOCUMENTS

| 5,752,054 | A | | 5/1998 | Garber et al. |
| 5,800,181 | A | | 9/1998 | Heinlein et al. |
| 5,893,070 | A | | 4/1999 | Garber et al. |
| 5,950,217 | A | * | 9/1999 | Heinlein et al. ............ 715/530 |
| 6,055,551 | A | * | 4/2000 | Heinlein et al. ............ 715/530 |
| 6,097,995 | A | | 8/2000 | Tipton et al. |
| 6,233,143 | B1 | * | 5/2001 | Gamble et al. ............. 361/685 |
| 6,335,733 | B1 | * | 1/2002 | Keren et al. ................ 345/418 |
| 6,901,372 | B1 | * | 5/2005 | Helzerman ...................... 705/7 |
| 2002/0103630 | A1 | * | 8/2002 | Aldred et al. ................. 703/10 |
| 2003/0208378 | A1 | * | 11/2003 | Thangaraj et al. ............. 705/2 |

OTHER PUBLICATIONS

Fenelon, P. et al "Towards integrated safety analysis and design", 1994 ACm pp. 21-32.*
Wodtke, Dirk et al "The Mentor project: Steps toward Enterprise—wide workflow management", 1996 IEEE pp. 556-565.*
Author Unknown "EH/EM Hazardous Waste Activities Handbook" Jun. 1996 pp. 5-1-5-12.*
Microsoft Inc. et al. "Microsoft Visio Templates" 2000 pp. 1-6.*

(Continued)

*Primary Examiner*—Ba Huynh
*Assistant Examiner*—Steven Theriault
(74) *Attorney, Agent, or Firm*—Gerhard W. Thielman, Esq.; James B. Bechtal, Esq.

(57) ABSTRACT

A multimedia safety analysis system used for system safety training and as an information repository is disclosed. The training device may be web based and may be simultaneously accessed from a computer server by numerous users or executed by an individual user. The system allows a user to investigate a system safety process and aides in the establishment of their own system safety program. The flow of a comprehensive system safety process is illustrated. Each data element in the process has numerous associated data items (information) that define how to accomplish the task associated with the Data Element including references, definitions, examples, acronyms, and specifications given to illustrate more fully what is needed to accomplish the task.

34 Claims, 29 Drawing Sheets

OTHER PUBLICATIONS

Dyadem Inc. et al "PHA-Pro 5 software" Dec. 2001. pp. 1-32 http://web.archive.org/web/20011211174916/www.dyadem.com/products/pha_pro_5.html.* o'Neill, Frank et al. "GLAST LAT System Safety Program Plan", Mar. 1, 2001 pp. 1-18.*

Safeware Engineering et al. "Safety critical requirements specification and analysis SPECTRM" htp://www.safeware-eng.com/index.php/publications/sswg2002 pp. 1-13.*

Appendix B, Hazard Analyses, www-person.monash.edu.au, 1996.

System Safety Engineering, www.profsatety.com, date unknown.

* cited by examiner

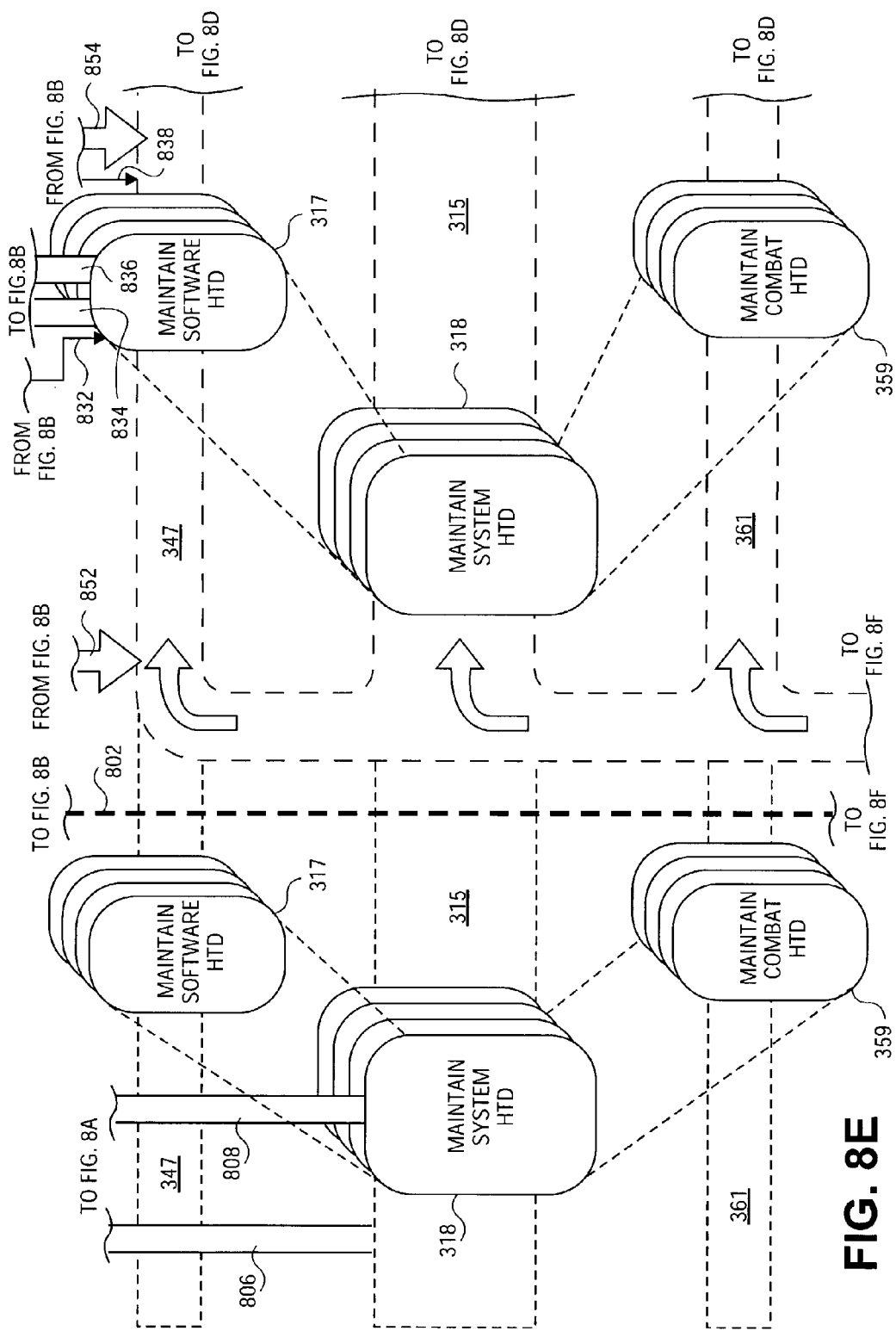

SAFETY ANALYSIS TRAINING DEVICE

FIELD OF THE INVENTION

This invention relates to a system safety analysis process, and more specifically to a system to aid in the performance of system safety analyses as well as the training of system safety professionals.

BACKGROUND OF THE INVENTION

In many different contexts, safety is important. This is especially true in the case of military combat and weapon systems. Failure to conduct the appropriate level of system safety analyses by trained system safety engineers precludes the identification and mitigation of system hazards, which could lead to the death or injury of personnel, damage to or loss of equipment, or damage to the environment. While there are many piecemeal methodologies for performing system safety analyses, there is no single comprehensive and repeatable safety analysis process for the safety professional to follow. Similarly, there is no electronic interactive system available which captures a comprehensive and repeatable safety analysis process and which can be reliably and effectively used to train system safety professionals. For these and other reasons, there is a need for the present invention.

SUMMARY OF THE INVENTION

The invention in at least some embodiments is an electronic interactive system for training system safety engineers in the implementation and conduct of a comprehensive and consistent safety analysis process. Such a training device also serves as a source for safety reference material. The training device can be software application designed to be local server or web-hosted, to lead a safety engineer through the process of implementing a system safety analysis in an easy to understand, step-by-step manner, maintaining links to useful tools, examples, and auxiliary sources of information. Preferably, the training device utilizes commercial off-the-shelf (COTS) pre-packaged software to bind the logical algorithms and links into a coherent flow, which facilitates the training and implementation process. Embodiments of the invention can be portable and may be accessible individually via CD-ROM, or may be web-hosted and accessed simultaneously by multiple users via a web browser with JavaScript support. Still other aspects, embodiments, and advantages of the invention will become apparent by reading the detailed description that follows, and by referring to the accompanying drawings.

BRIEF DESCRIPTION OF THE DRAWINGS

FIG. 1B is a diagram showing the manner by which

FIG. 1C is a diagram showing the manner by which FIGS. 8A–8G are to be laid out to properly show the safety disposition ($3^{rd}$) phase and the sustained system safety engineering (sustenance) (4) phase of FIG. 1A in more detail.

FIGS. 3A, 3B, 3C, 3D, 3E, 3F, 3G, and 3H are diagrams showing the detailed safety analysis ($2^{nd}$) phase of FIG. 1A in more detail, according to an embodiment of the invention.

FIGS. 8A, 8B, 8C, 8D, 8E, 8F, and 8G are diagrams showing the safety disposition ($3^{rd}$) phase and the sustained system safety engineering (sustenance) ($4^{th}$) phase of FIG. 1A in more detail, according to an embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. For instance, whereas the invention is substantially described in relation to a naval combat system, it is applicable to other types of military and non-military systems as well. The following detailed description is, therefore, not to be taken in a limiting sense, and the scope of the present invention is defined only by the appended claims.

Overview

The detailed description is substantially divided into two parts. First, an integrated interoperable safety analysis process is described in detail. Second, the manner by which a training device for the process, according to an embodiment of the invention, is described. The training device is described in relation to the process. For instance, the manner by which the training device can be used to interact with and navigate the safety analysis process is described.

Safety Process

Figure 1A:
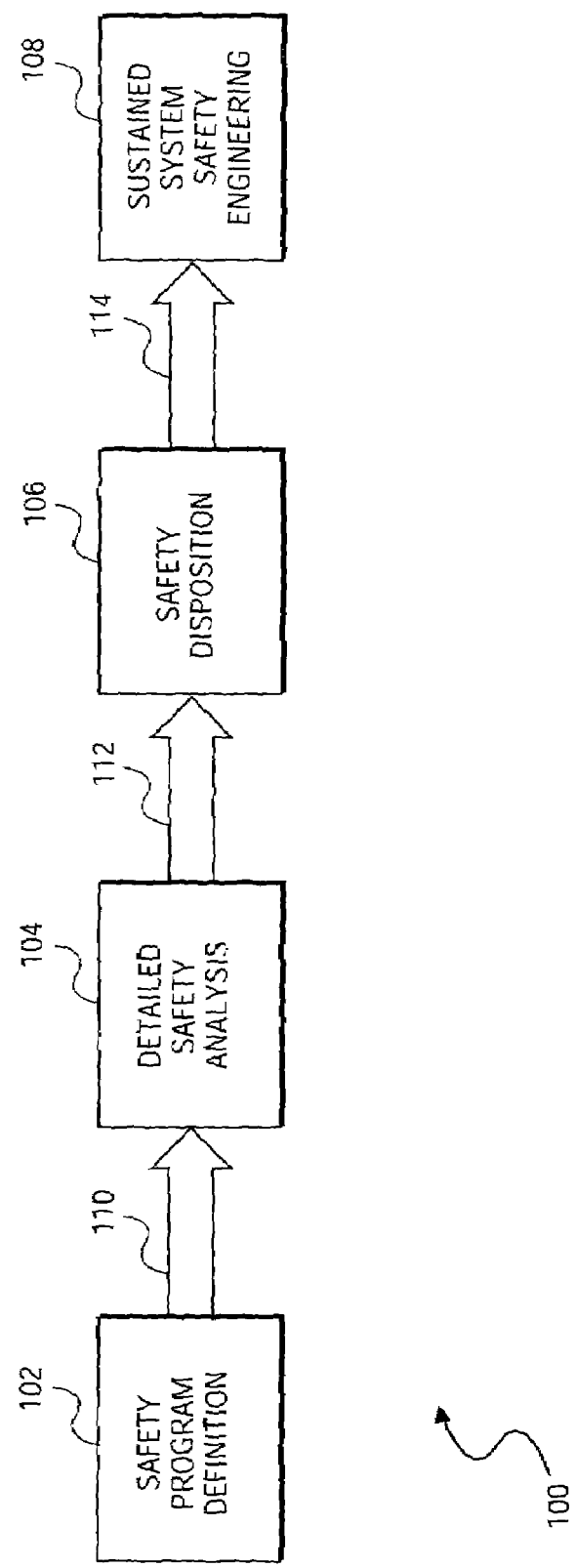
FIG. 1A is a diagram showing an overview of an integrated interoperable safety analysis process that can be interacted with and navigated by an embodiment of the invention.

FIG. 1A shows an overview of an integrated interoperable safety analysis process 100. As will become apparent by reading the detailed description, the process is thorough, efficient, cost-effective, technically efficient, systematic, and maintainable. The process 100 has four phases: a safety program definition phase 102, a detailed safety analysis phase 104, a safety disposition phase 106, and a sustained system safety engineering phase 108. The phases are preferably stepped through as indicated by the arrows 110, 112, and 114. Each phase is described in detail in a subsequent section of the detailed description.

The process 100 can be utilized and implemented in a number of different scenarios and applications, such as, for example, naval surface weapon systems. In such instance, the process 100 enables integration of the software safety analysis with the system safety efforts themselves. The process 100 can also enable the tracking of ship-level combat system hazards.

Figure 1B:
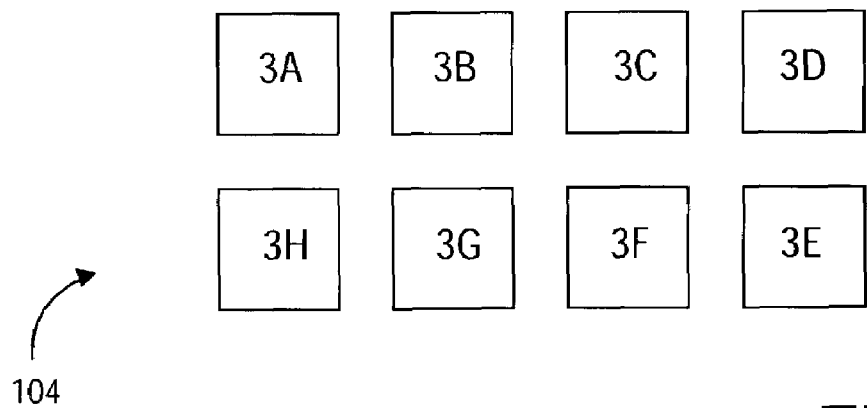
Figure 1C:
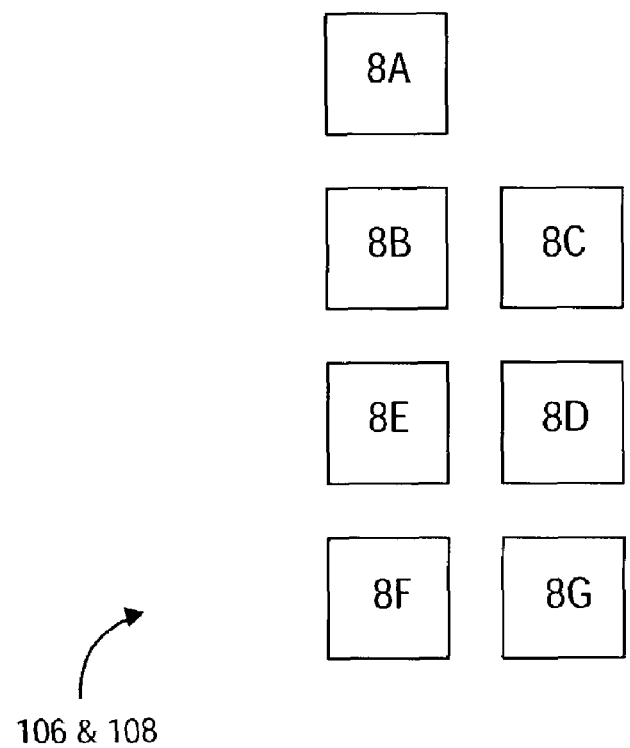

In the sub-sections of the detailed description that follow, reference is made to diagrams. Rounded boxes in these diagrams represent inputs, such as critical inputs, to the process 100. Rectangular boxes represent products. A starred item indicates that a safety design review, such as a critical safety design review, is performed in conjunction with the item. A check-marked item indicates that an engineer review, such as a staff engineer review, occurs in conjunction with the item. Similarly, an asterisked and check-marked item indicates that an engineer review, as required or appropriate, occurs in conjunction with the item. Furthermore, FIG. 1B shows the manner by which FIGS. 3A–3H should be laid out to view the detailed safety analysis phase 104, whereas FIG. 1C shows the manner by which FIGS. 8A–8G should be laid out to view the safety disposition phase 106, and the sustenance phase 108.

Figure 2A:
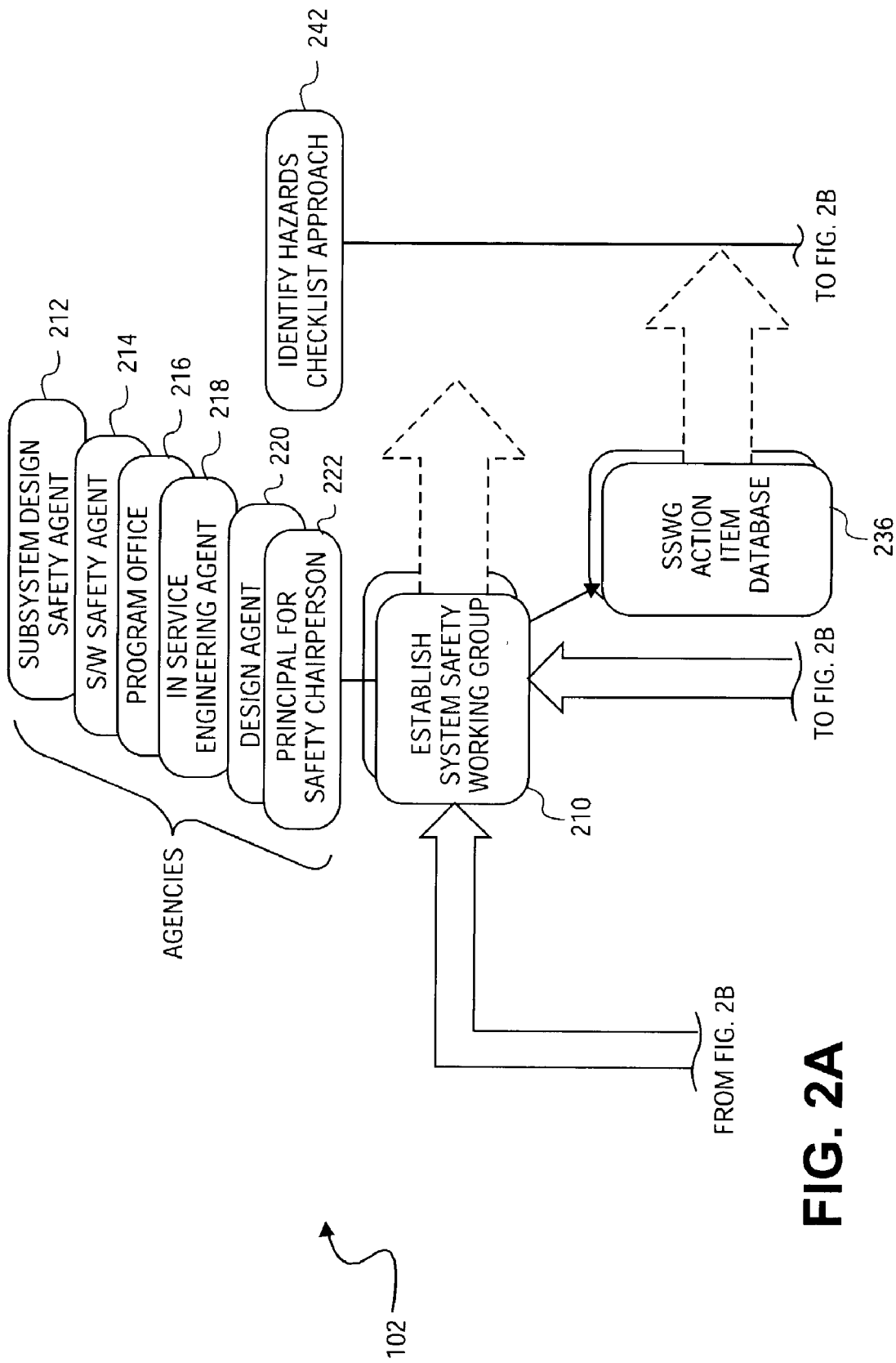
FIGS. 2A and 2B are diagrams showing the safety program definition ($1^{st}$) phase of FIG. 1A in more detail, according to an embodiment of the invention.
Figure 2B:
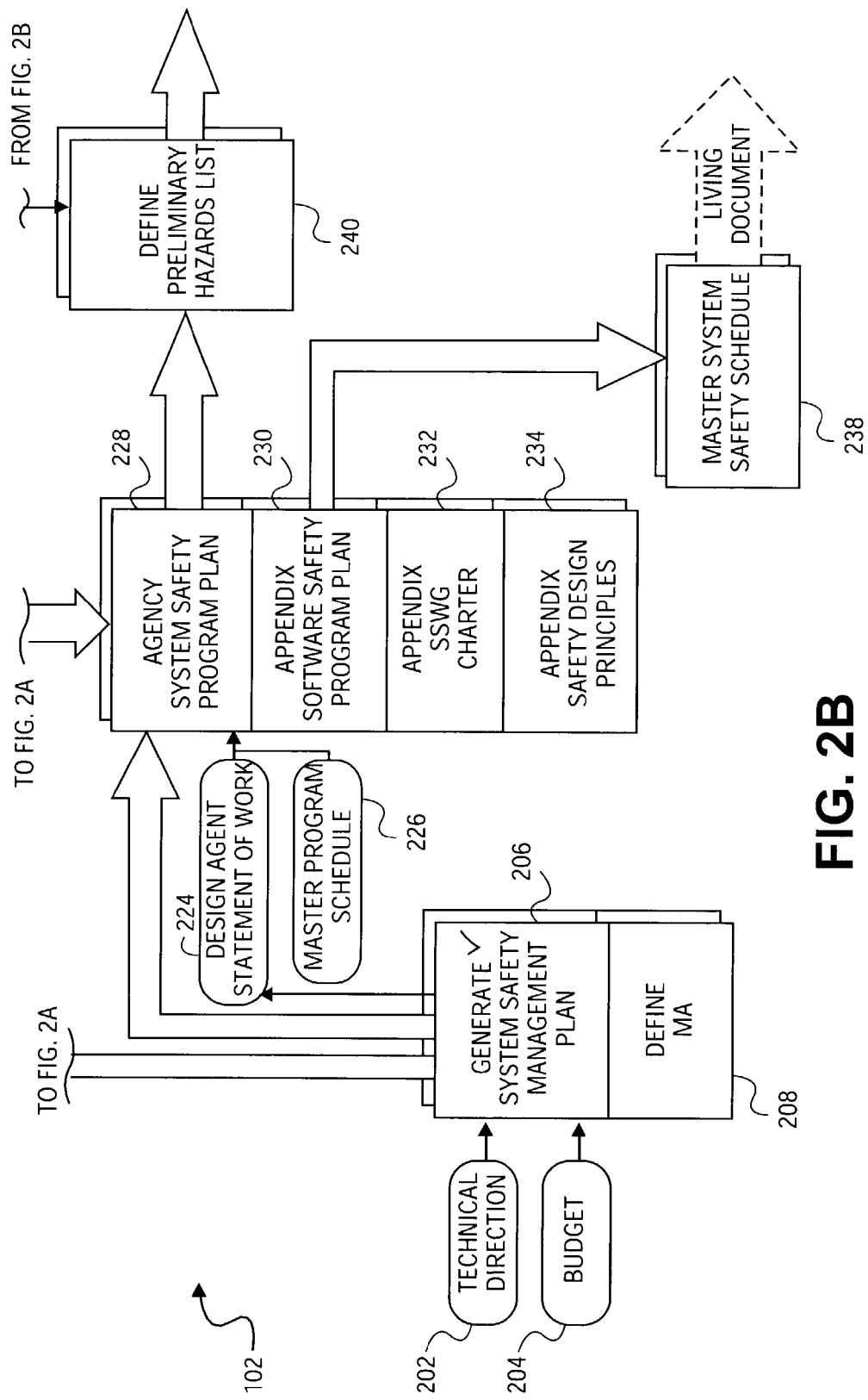

FIGS. 2A and 2B show the safety program definition phase 102 of FIG. 1A in detail, according to an embodiment of the invention. The description of FIGS. 2A and 2B is provided as if these two figures made up one large figure. Therefore, some components indicated by reference numerals reside only in FIG. 2A, whereas other components indicated by reference numerals reside only in FIG. 2B.

A technical direction input 202 and a budget input 204 are provided to generate a system safety management plan 206. In conjunction with this, management acceptance 208 is defined. As an example only, the management acceptance 208 may have four levels, each level appropriate to the risk associated with a particular item. A high risk means that the risk must be accepted by the Assistant Secretary of the Navy (Research, Development, and Acquisition) (ASN/RDA). A serious risk means that the risk must be accepted by the Program Executive Officer (PEO). A medium risk means that the risk must be accepted by the program manager. A low risk means that the risk must be accepted by the Principal for Safety (PFS), and forwarded to the program manager for informational purposes.

Once the system safety management plan 206 has been generated, three tasks occur. First, a system safety working group (SSWG) 210 is established as the safety body of knowledge for that weapon system. The SSWG 210 may be made up of different parties, such as a subsystem design safety agent 212, a software safety agent 214, a program office 216, an in-service engineering agent 218, a design agent 220, and a principal for safety chairperson 222. Next, the design agent 220 in particular provides a design agent statement of work 224. Finally, the SSWG 210, based on the system safety management plan 206, the statement of work 224, and a master program schedule 226, generates an agency system safety program plan 228.

As appendices to the agency system safety program plan 228, a software safety program plan 230, a SSWG charter 232, and safety design principles 234 may also be generated. Examples of the safety principles 234 are as follows. First, all system safety programs will follow the safety order of precedence to minimize safety risk by: eliminating the hazard through design; controlling the hazard through design safety devices; using warnings at the hazard site; and, using procedures and training. Second, from any non-tactical mode, such as training or maintenance, there shall be at least two independent actions required to return to the tactical mode. Third, the fire control system shall have positive identification of the ordnance/weapon present in the launcher. Identification shall extend to all relevant safety characteristics of the ordnance/weapon. Fourth, there shall be no single or double point or common mode failures that result in a high or serious safety hazard. Fifth, all baseline designs and any changes to approved baseline designs shall have full benefit of a system safety program appropriate to the identified maximum credible event (MCE).

The SSWG 210 also generates an SSWG action item database 236. From the software safety program plan 230, a master system safety schedule 238 is generated, which is a living document that dynamically changes. The agency system safety program plan 228, once generated, also leads to defining a preliminary hazards list 240. The preliminary hazards list 240 is additionally based on a hazards checklist approach 242 that has previously been defined.

FIGS. 3A–3H show the detailed safety analysis phase 104 of FIG. 1A in detail, according to an embodiment of the invention, and should be laid out as indicated in FIG. 1B. Starting first at FIG. 3H, the Preliminary Hazard Analysis (PHA) 302 is established such that there is a set of system safety critical event (SSCE) records (or, system hazard tracking database) 318, including the SSCE records 318a, 318b, . . . , 318. The PHA 302 includes causal factors 304, including human causal factors 306, interface causal factors 308, and sub-system causal factors 310. The causal factors 304 contribute to the definition of initial system safety criticality functions 312. The interface factors 308 and the sub-system factors 310 input to software 314, which is used to define initial system safety critical events 316. The critical events 316 are used to generate the set of SSCE records 318. The human factors 306 are human, machine, or hardware influenced, as indicated by the box 320, whereas the interface factors 308 and the sub-system factors 310 are hardware influenced, as indicated by the boxes 322 and 324, respectively. The PHA 302 is used to initiate the Programmatic Environment, Safety, and Health Evaluation (PESHE) 326, which is a living document. A process 315 starts at the causal factors 304, leads to the records 318, and continues on to FIG. 3G, as will be described.

Software safety criticality can be categorized into autonomous, semi-autonomous, semi-autonomous with redundant backup, influential, and no safety involvement categories. The autonomous category is where the software item exercises autonomous control over potentially hazardous hardware systems, sub-systems, or components without the possibility of intervention to preclude the occurrence of a hazard. The semi-autonomous category is where the software item displays safety-related information or exercises control over potentially hazardous hardware systems, sub-systems, or components with the possibility of intervention to preclude the occurrence of a hazard.

The semi-autonomous with redundant backup category is where the software item displays safety-related information or exercises control over potentially hazardous hardware systems, sub-systems, or components, but where there are two or more independent safety measures with the system, and external to the software item. The influential category is where the software item processes safety-related information but does not directly control potentially hazardous hardware systems, sub-systems, or components. The no safety involvement category is where the software item does not process safety-related data, or exercise control over potentially hazardous hardware systems, sub-systems, or components.

Figure 3A:
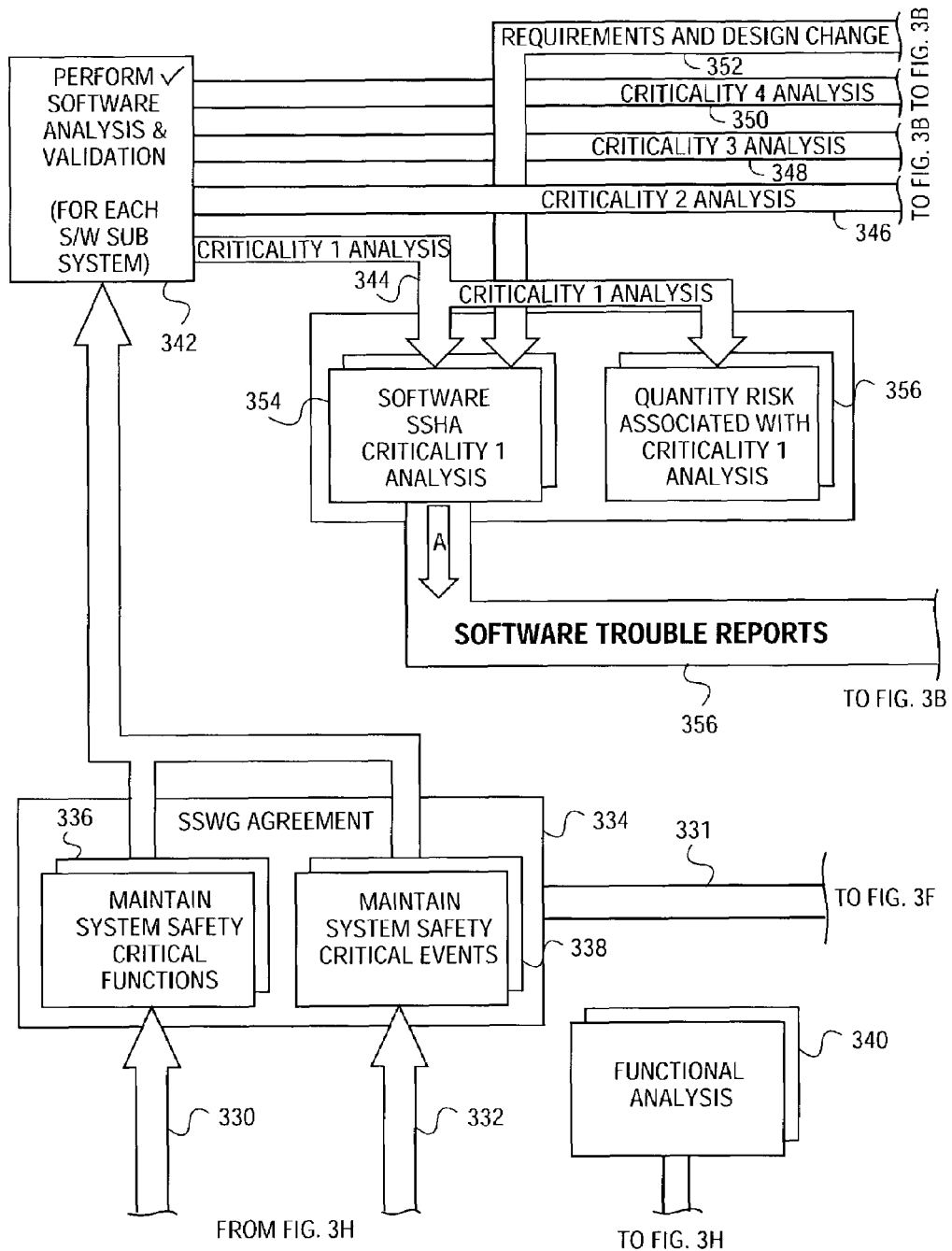
FIGS. 3A–3H are to be laid out to properly show the detailed safety analysis ($2^{nd}$) phase of FIG. 1A in more detail.
Figure 3B:
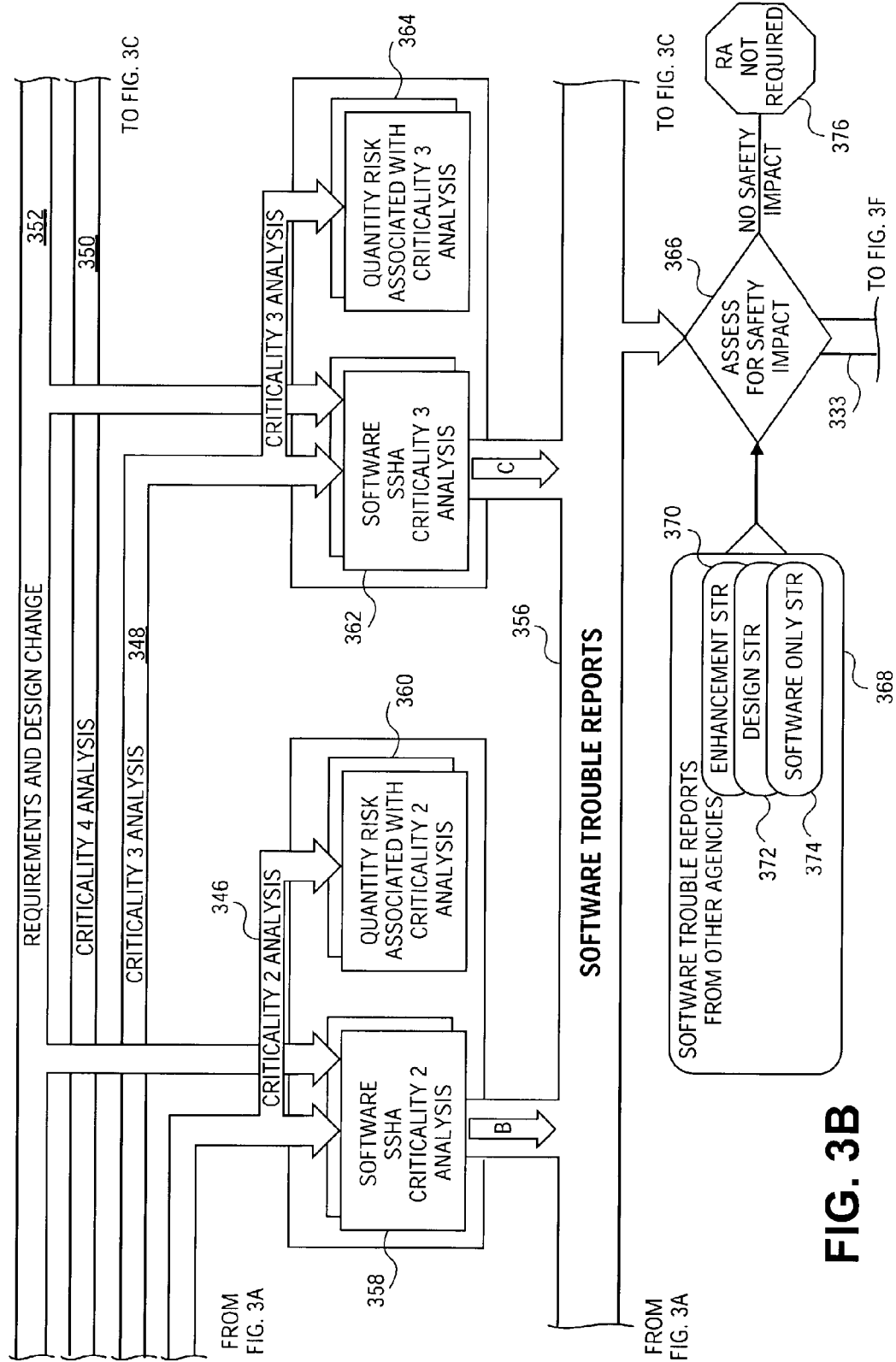
Figure 3C:
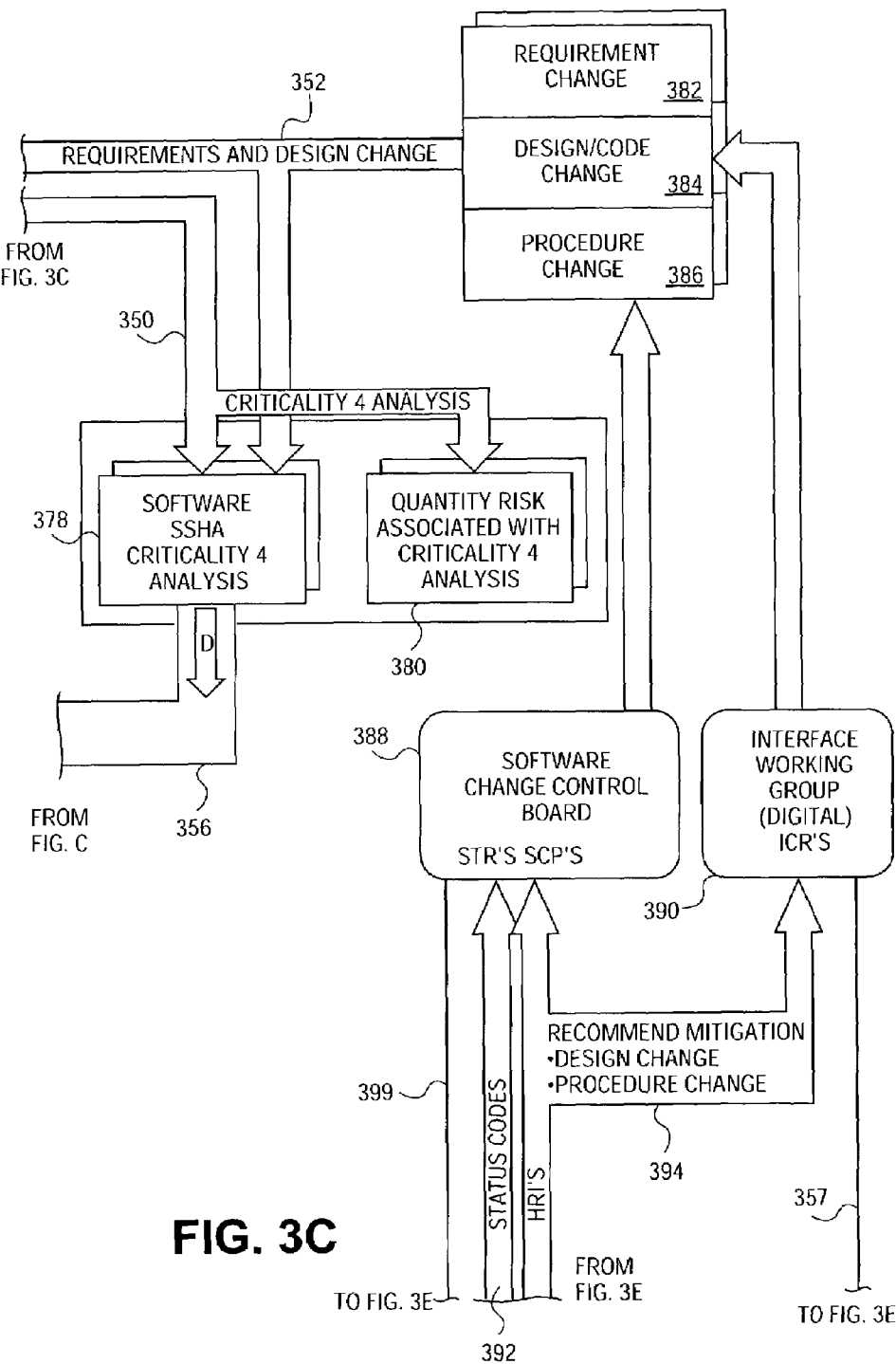
Figure 3D:
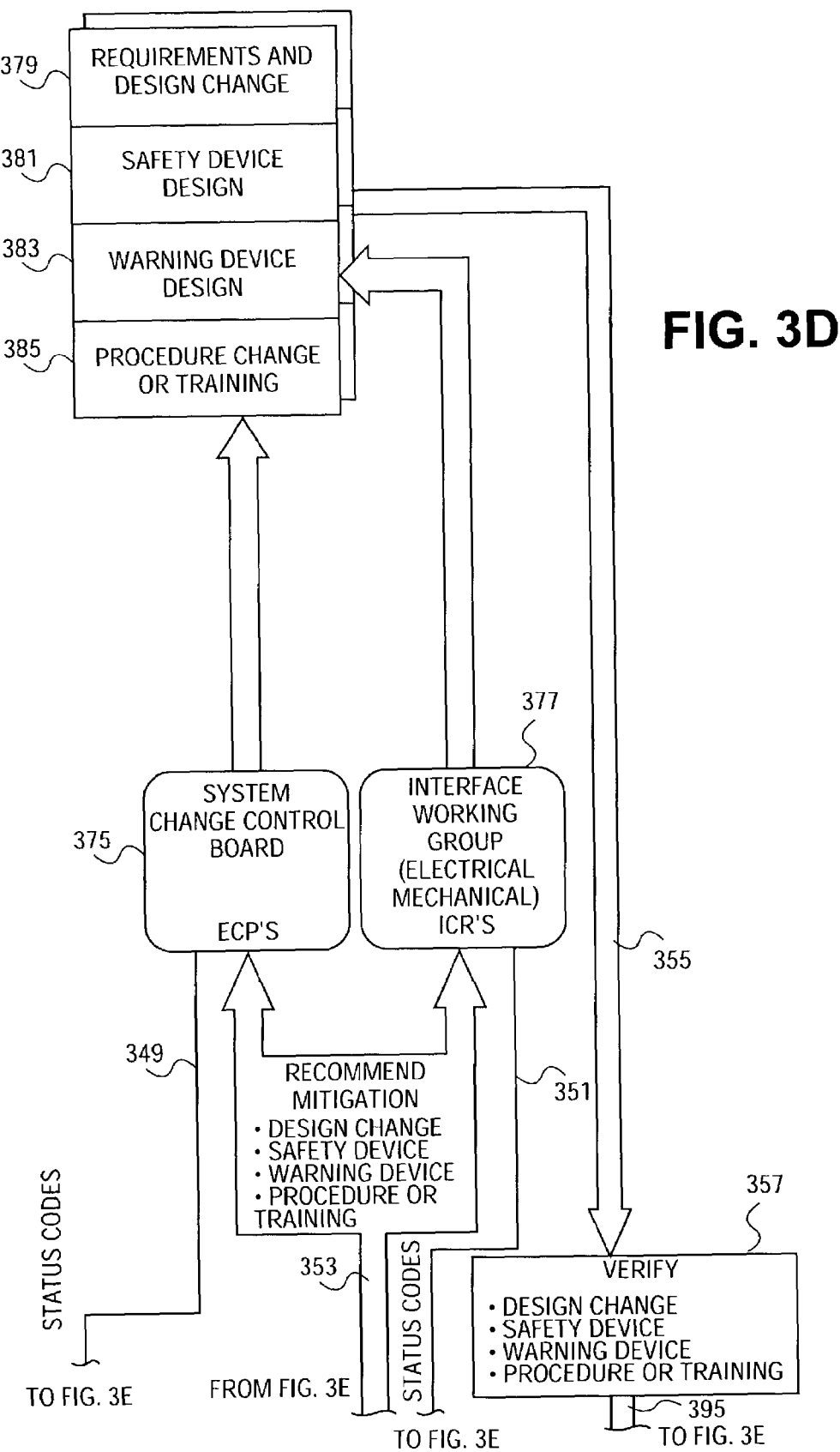
Figure 3E:
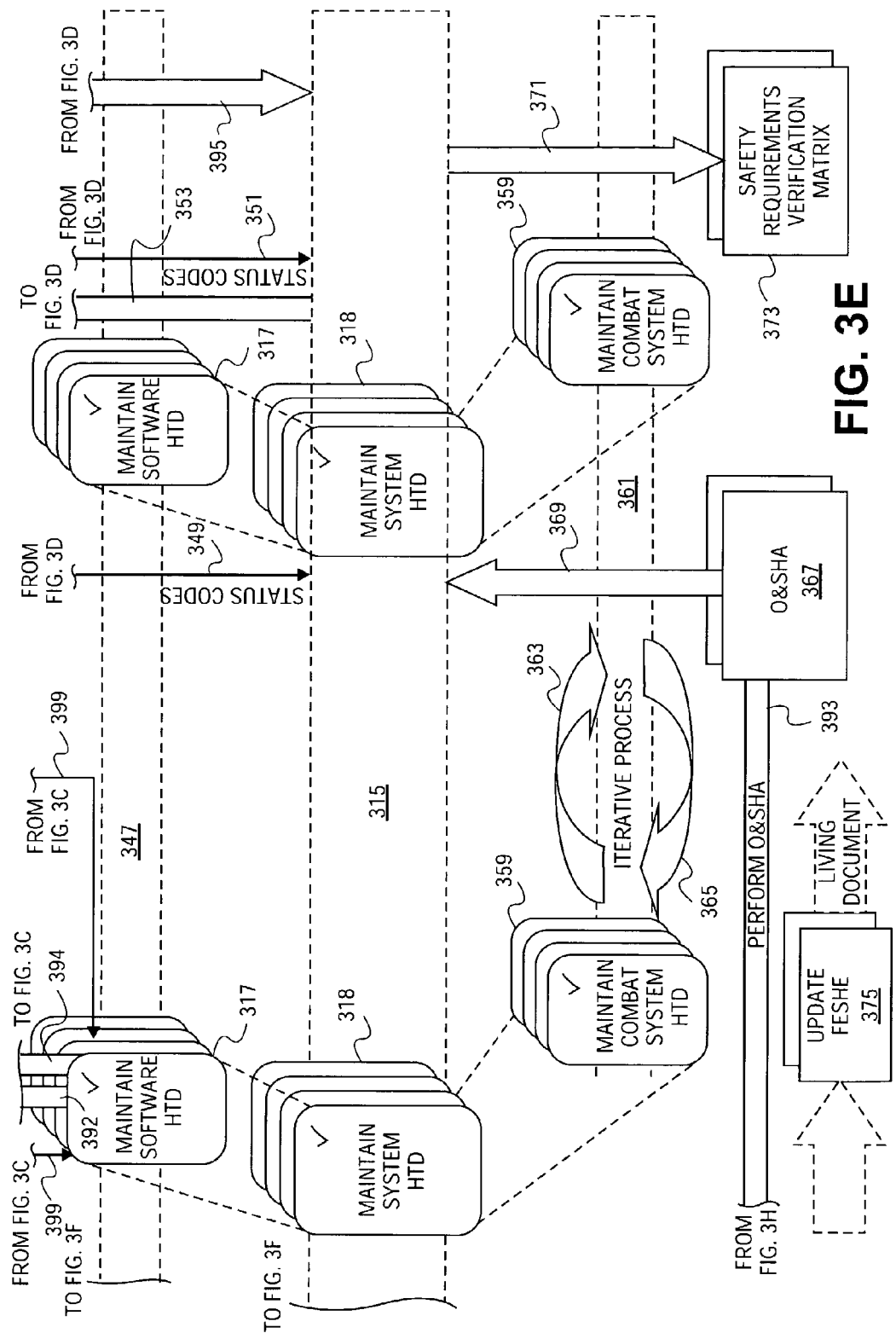
Figure 3F:
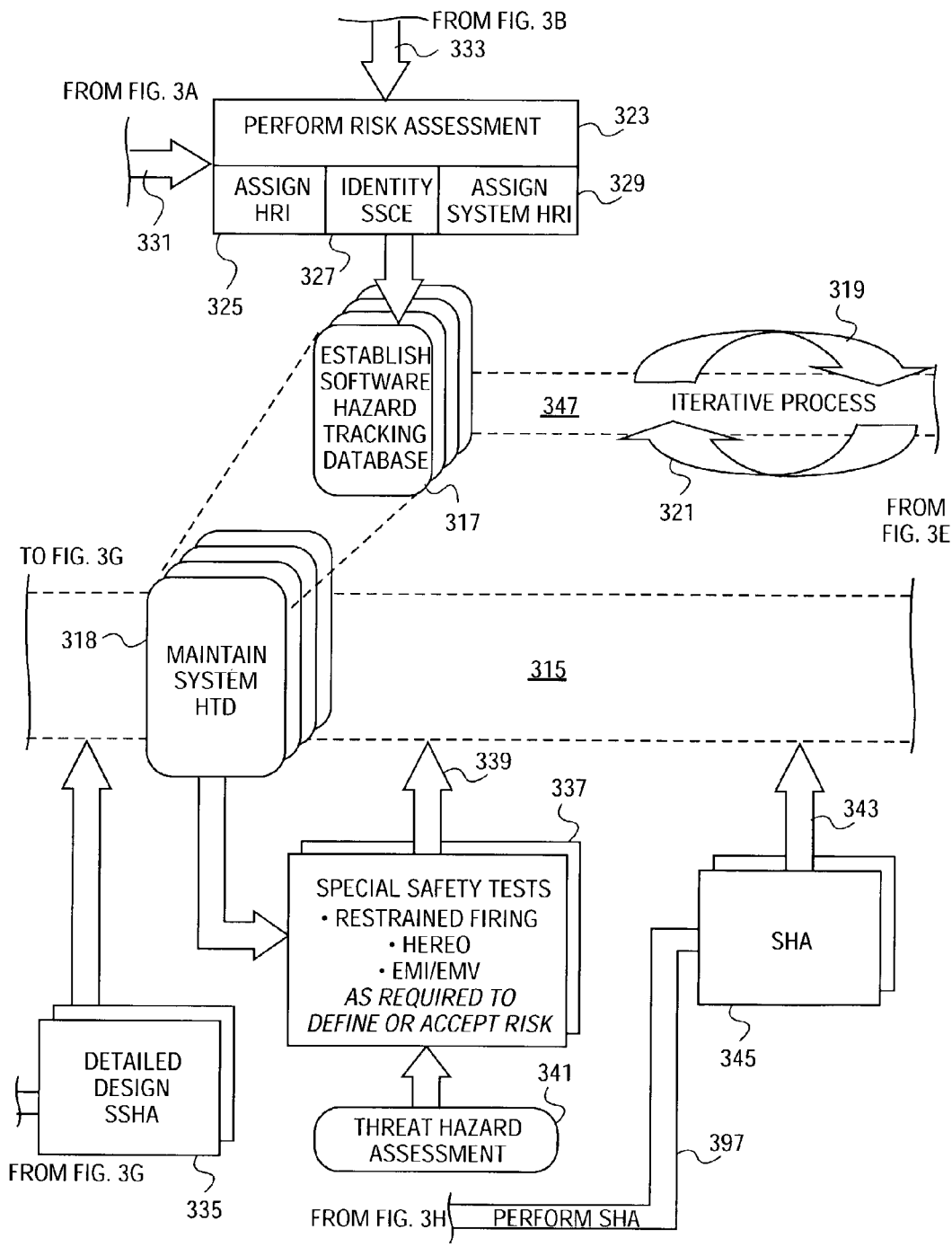
Figure 3G:
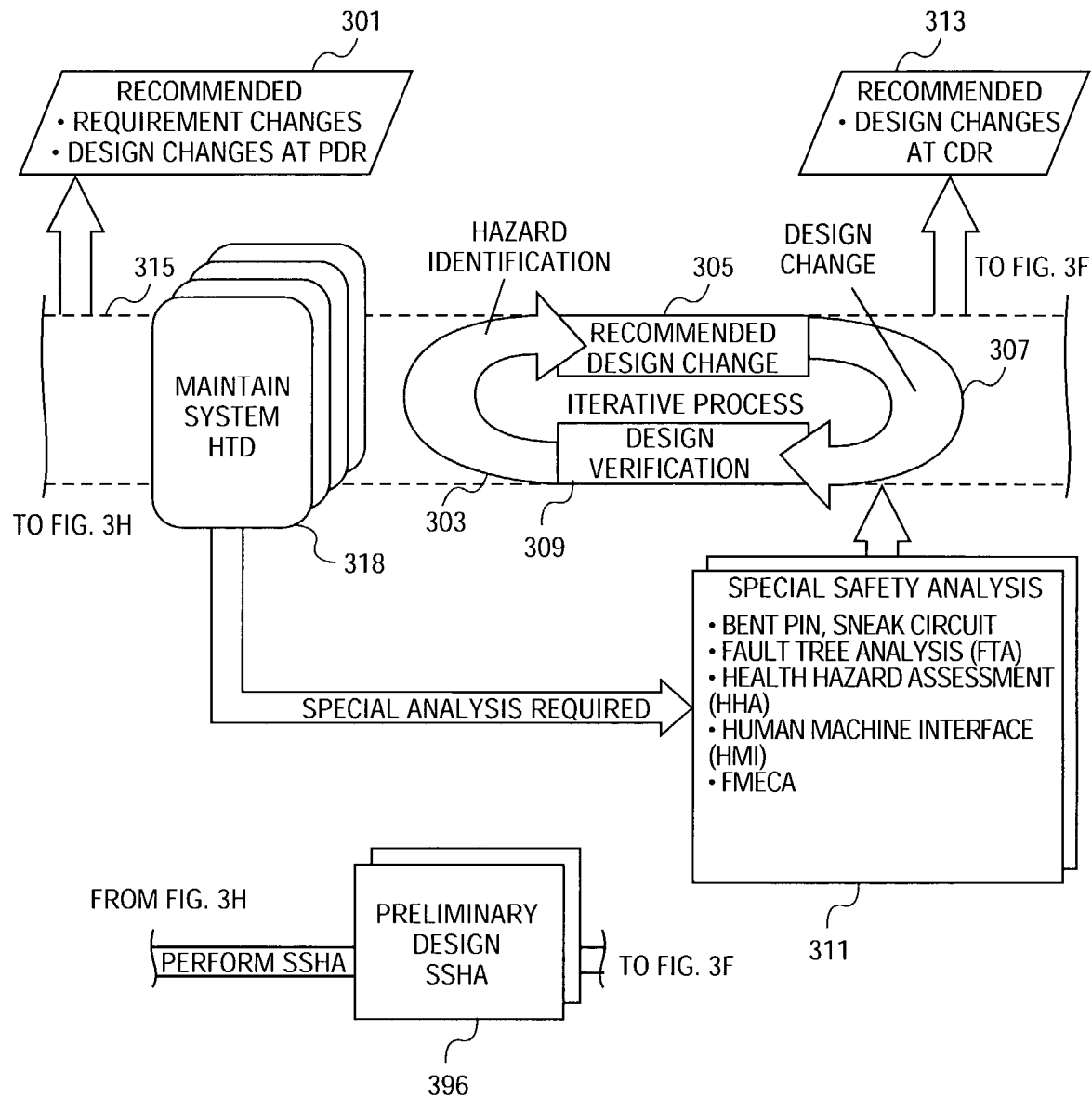
Figure 3H:
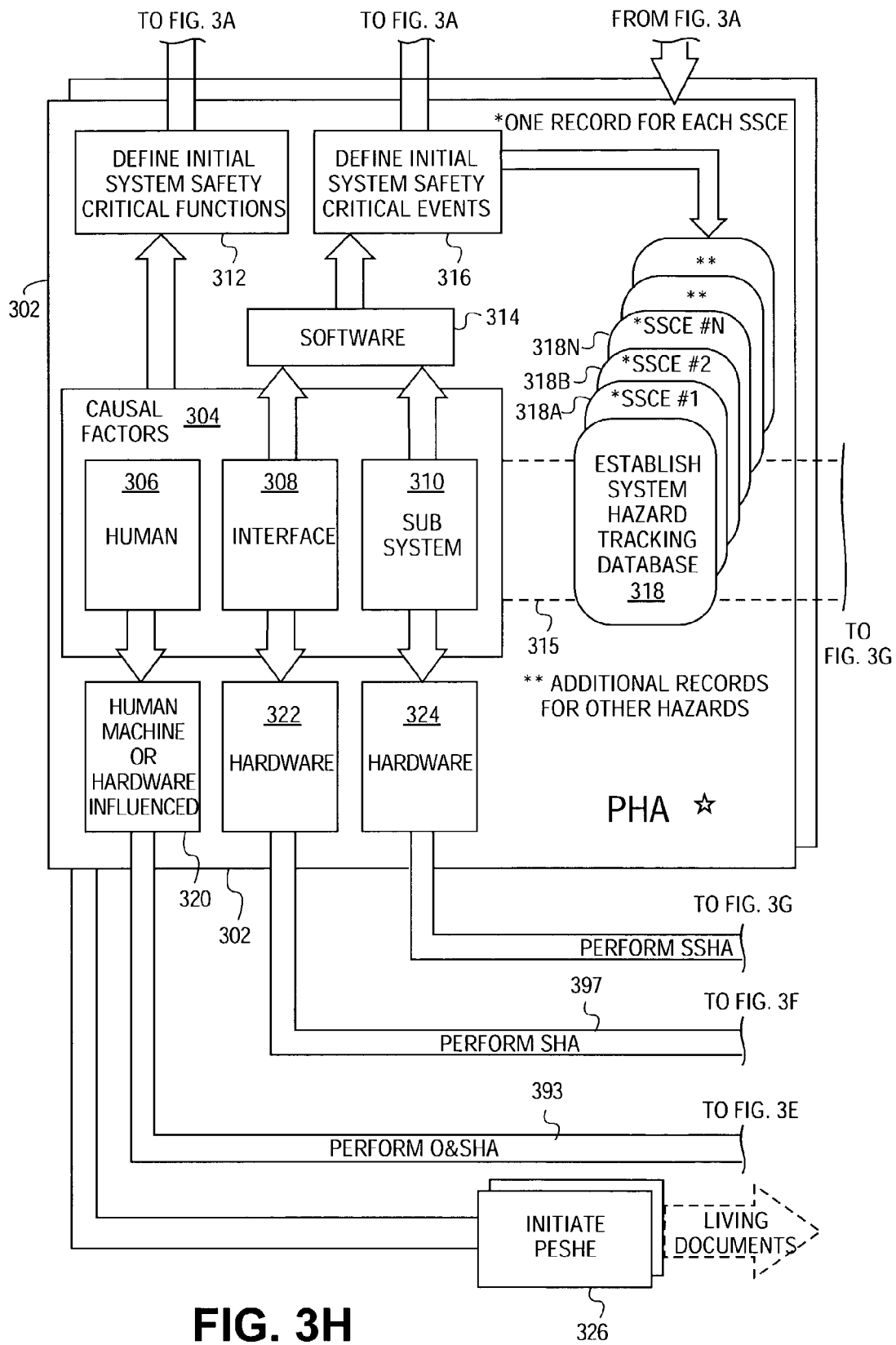

Referring next to FIG. 3A, functional analysis 340 contributes to the PHA 302 of FIG. 3H. Furthermore, the initial system safety criticality functions 312 of FIG. 3H and the initial system safety critical events 316 of FIG. 3H are used to generate the SSWG agreement 334, as indicated by the arrows 330 and 332, respectively. The SSWG agreement 334 includes maintaining system safety criticality functions 336 and maintaining system safety critical events 338, which are coincidental with the critical events 316. Examples of system safety critical functions 336 include ordnance selection, digital data transmission, ordnance safing, and system mode control.

Ordnance selection is the process of designating an ordnance item and establishing an electrical connection. Digital data transmission is the initiation, transmission, and processing of digital information that contributes to the activation of ordnance events or the accomplishment of other system safety criticality functions. Ordnance safing is the initiation, transmission, and processing of electrical signals that cause ordnance to return to a safe condition. This includes the monitoring functions associated with the process. System mode control includes the events and processing that cause the weapon system to transition to a different operating mode and the proper use of electrical data items within that operating mode.

Still referring to FIG. 3A, examples of system safety critical events 338 include critical events in tactical, standby, training, and all modes. Critical events in the tactical mode include firing into a no-fire zone, incorrect target identification, restrained firing, inadvertent missile selection, and premature missile arming. Critical events in the standby mode include inadvertent missile arming and inadvertent missile selection. Critical events in the training mode include restrained firing and inadvertent missile selection. Critical events in all modes include inadvertent launch, inadvertent missile release, and inadvertent missile battery activation.

Still referring to FIG. 3A, the SSWG agreement 334 leads to the performance of software analysis and validation 342 for each software sub-system. These include a Rigor Level One analysis 344, a Rigor Level Two analysis 346, a Rigor Level Three analysis 348, and a Rigor Level Four analysis 350. The Rigor Level One analysis 344 includes software Subsystem Hazard Analysis (SSHA) criticality one analysis 354, which is affected by requirements and design changes 352, and also includes quantity risk associated with the Rigor Level One analysis 356. The result of the Rigor Level One analysis is software trouble reports 356.

In FIG. 3B, the Rigor Level Two analysis 346 includes software SSHA Rigor Level Two analysis 358, which is affected by the requirements and design changes 352, and also includes quantity risk associated with the Rigor Level Two analysis 360. Similarly, the Rigor Level Three analysis 348 includes software SSHA Rigor Level Three analysis 362, which is affected by the requirements and design changes 352, and also includes quantity risk associated with the Rigor Level Three analysis 364. Both the software SSHA Rigor Level Two analysis 358 and the software SSHA Rigor Level Three analysis 362 results in the software trouble reports 356.

Still referring to FIG. 3B, the software trouble reports (STR's) 368 are used to conduct an assessment for safety impact 366. The STR's 368 include enhancement STR's 370, design STR's 372, and software-only STR's 374. One result of the assessment 366 is that there is no safety impact, such that a Risk Assessment (RA) is not required, as indicated by the box 376.

In FIG. 3C, the Rigor Level Four analysis 350 includes software SSHA criticality four analysis 378, which is affected by the requirements and design changes 352, and also includes quantity risk associated with the Rigor Level Four analysis 380. The Rigor Level Four analysis also results in the software trouble reports 356. The requirements and design changes 352 result from requirement changes 382, design or code changes 384, and procedure changes 386. The procedure changes 386 specifically are determined by the software change control board 388, whereas the design or code changes 384 are specifically determined by the interface working group (digital) 390. The software change control board 388 considers both STR's resulting from status codes 392, and Software Change Proposal (SCP's) resulting from Hazard Risk Index (HRI's), and recommended mitigation, such as design changes and procedure changes, 394. The interface working group 390 considers Interface Change Requests (ICR's) resulting from HRI's, and recommendation mitigation, such as design changes and procedure changes, 394.

Referring next to FIG. 3G, the hardware influence indicated by box 324 of FIG. 3H results in the performance of a preliminary design SSHA 396. Within the process 315, the system hazard tracking database (HTD) 318 is maintained. Furthermore, requirement changes and design changes at Preliminary Design Review (PDR) are recommended, as indicated by the box 301. An iterative process involving hazard identification 303 leads to recommended design changes 305, and the design changes 307 lead to design verification 309. This process is also affected by the special safety analysis 311 that leads from maintaining the system HTD 318. The special analysis 311 includes bent pin analysis, sneak circuit analysis, fault tree analysis, health hazard assessments, human machine interface analysis, and Failure Mode Effects and Criticality Analysis (FMECA). Finally, design changes at Critical Design Review (CDR) are recommended, as indicated by the box 313.

Referring next to FIG. 3F, within the process 315, the system HTD 318 is again maintained. This includes the establishment of the software HTD 317, which is an iterative process 347, as indicated by the arrows 319 and 321. The establishment is also affected by the performance of a risk assessment 323, including assigning an HRI 325, identifying an SSCE 327, and assigning a system HRI 329. The risk assessment 323 is based on the SSWG agreement 336 of FIG. 3A, as indicated by the arrow 331, as well as the safety impact assessment 366 of FIG. 3B, as indicated by the arrow 333. Furthermore, part of the process 315 is a detailed design SSHA 335, resulting from the preliminary design SSHA 396 of FIG. 3G.

Still referring to FIG. 3F, maintenance of the system HTD 318 leads to special safety tests 337, which affects the process 315, as indicated by the arrow 339. The special safety tests 337 can include restrained firing, Hazards of Electromagnetic Radiation to Ordnance (HERO), electromagnetic vulnerability (EMV) and electromagnetic interference (EMI) testing, and so on. Hazard assessment threats 341 also influence the special safety tests 337. An System Hazard Analysis (SHA) 345 is also performed, leading from the hardware influences of box 322 of FIG. 3H, as indicated by the arrow 397, and the SHA 345 affects the process 315, as indicated by the arrow 343.

Referring next to FIG. 3E, within the 315, the system HTD 318 is again maintained. Specifically, the software HTD 317 is maintained within the process 347. The software HTD 317 is affected by the determinations of the software change control board 388 of FIG. 3C, as indicated by the arrow 399, and also results in status codes 392 and HRI's 394 that are provided to the board 388 of FIG. 3C and the group 390 of FIG. 3C. Status codes 349 and 351, from FIG. 3D, affect the process 315, as does verification 357 of FIG. 3D, as indicated by the arrow 395. The process 315 further leads to recommended mitigation 353 in FIG. 3D.

Still referring to FIG. 3E, a combat system HTD 359 is maintained in an iterative process 361, as indicated by the arrows 363 and 365. An Operating and Support Hazard Analysis (O&SHA) 367 is performed, based on the human machine or hardware influences 320 of FIG. 3H, as indicated by the arrow 393. The O&SHA 367 also affects the process 315, as indicated by the arrow 369. As indicated by the arrow 371, the process 315 leads to a safety requirements verification matrix 373. The PESHE 375 is also updated, and is a living document.

Referring finally to FIG. 3D, the system change control board 375 generates status codes 349, as a result of the Engineering Change Proposals (ECP's) from the recommended mitigation 353. Similarly, the interface working group (electrical mechanical) 377 generates status codes 351, as a result of the ICR's from the recommended mitigation 353. The recommendation mitigation 353 can include design changes, safety device additions, warning device additions, or changes in procedures or training.

Still referring to FIG. 3D, requirements and design changes 379 include safety device design 381, warning device design 383, and procedure changes or training 385. The control board 375 generates the procedure changes or training 385. The working group 377 generates the safety device design 381 and the warning device design 383. The requirements and design changes 379 are then verified, as indicated by the arrow 355. The verification 357 includes specifically verification of the design changes, safety devices, warning devices, and procedures or training.

Figure 4A:
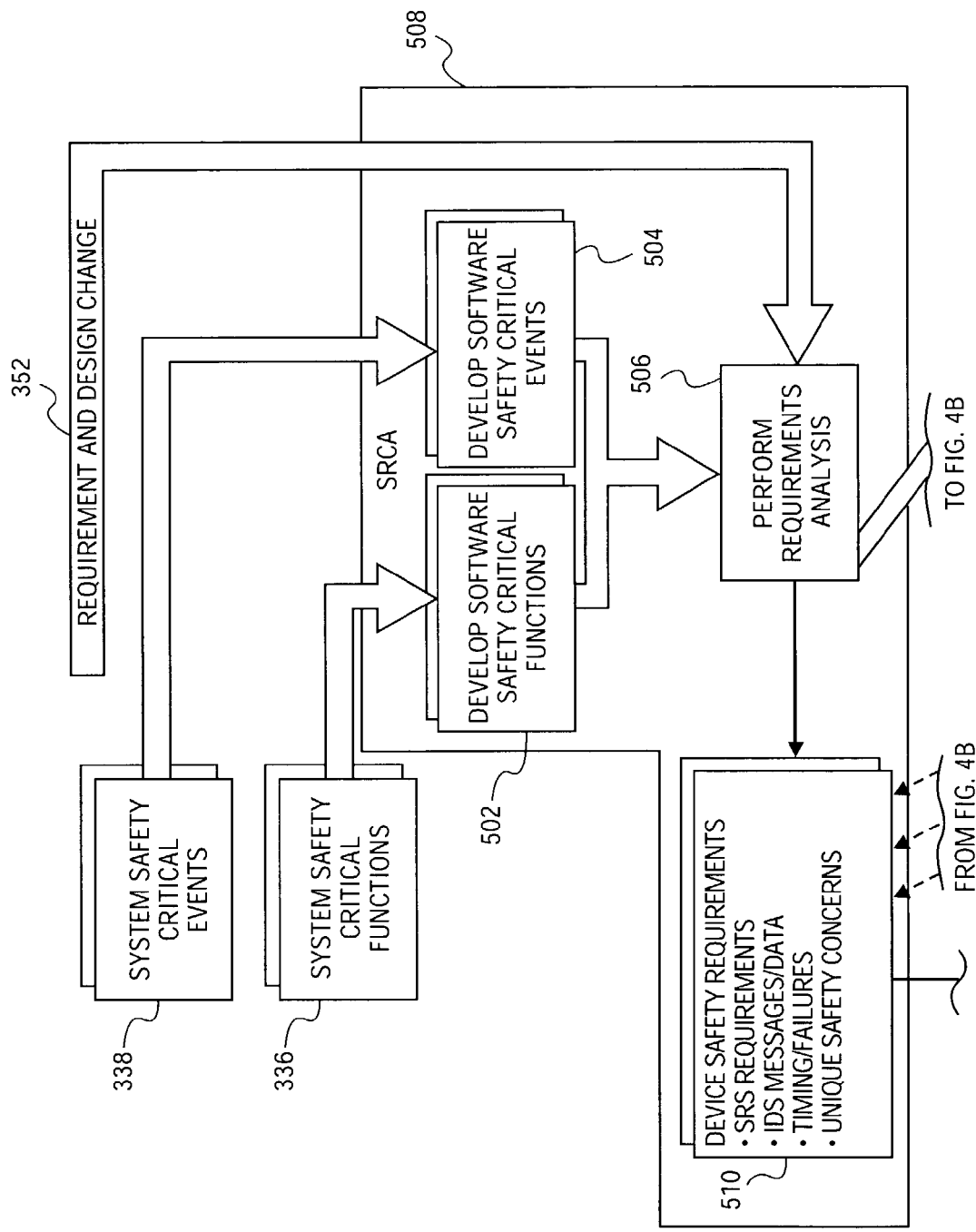
FIGS. 4A and 4B are diagrams showing the Rigor Level One software analysis of FIG. 3A in more detail, according to an embodiment of the invention.
Figure 4B:
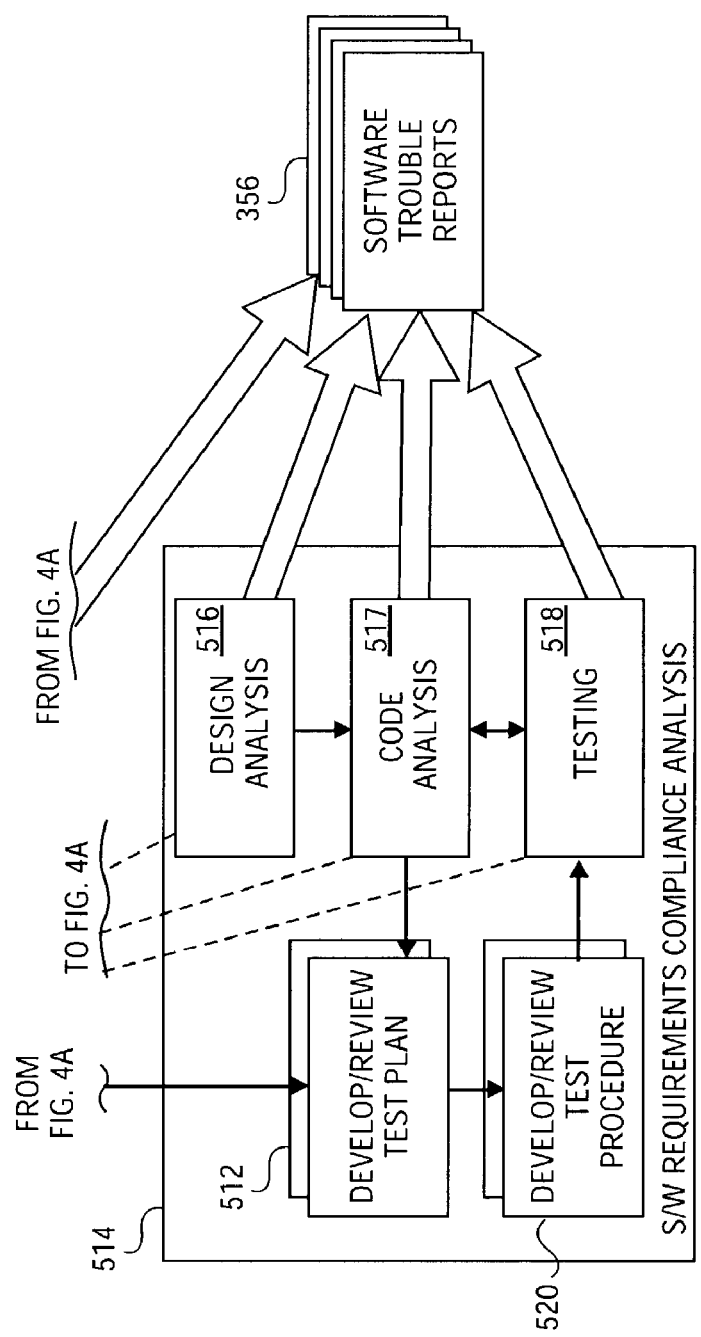

FIGS. 4A and 4B show the criticality one software analysis 344 of FIG. 3A in detail, according to an embodiment of the invention. The description of FIGS. 4A and 4B is provided as if these two figures made up one large figure. Therefore, some components indicated by reference numerals reside only in FIG. 4A, whereas other components indicated by reference numerals reside only in FIG. 4B.

The system safety critical events 338 are used to develop software safety critical events 504 in the Software Requirements Criteria Analysis (SRCA) 508, whereas the system safety critical functions 336 are used to develop software safety critical functions 502 in the SRCA 408. The functions 502 and the events 504, along with the requirements and design changes 352, are used to perform a requirements analysis 506. The requirements analysis 406 leads to device safety requirements 510, including Software Requirement Specification (SRS) requirements, Interface Design Specification (IDS) messages and data, timing and failures, and unique safety concerns.

The device safety requirements 510 are used to develop or review a test plan 512, which is part of a software requirements compliance analysis 514. A design analysis 516 also affects the test plan 512, and the design analysis 516 additionally affects the device safety requirements 510. The design analysis 516 affects code analysis 517, which affects testing 518, which itself affects the device safety requirements 510. After development and review of the test plan 512, including use of the code analysis 517, test procedures 520 are developed and reviewed, on which basis the testing 518 is accomplished. The testing 518, along with the design analysis 516 and the code analysis 517, also affect the software trouble reports 356.

Figure 5A:
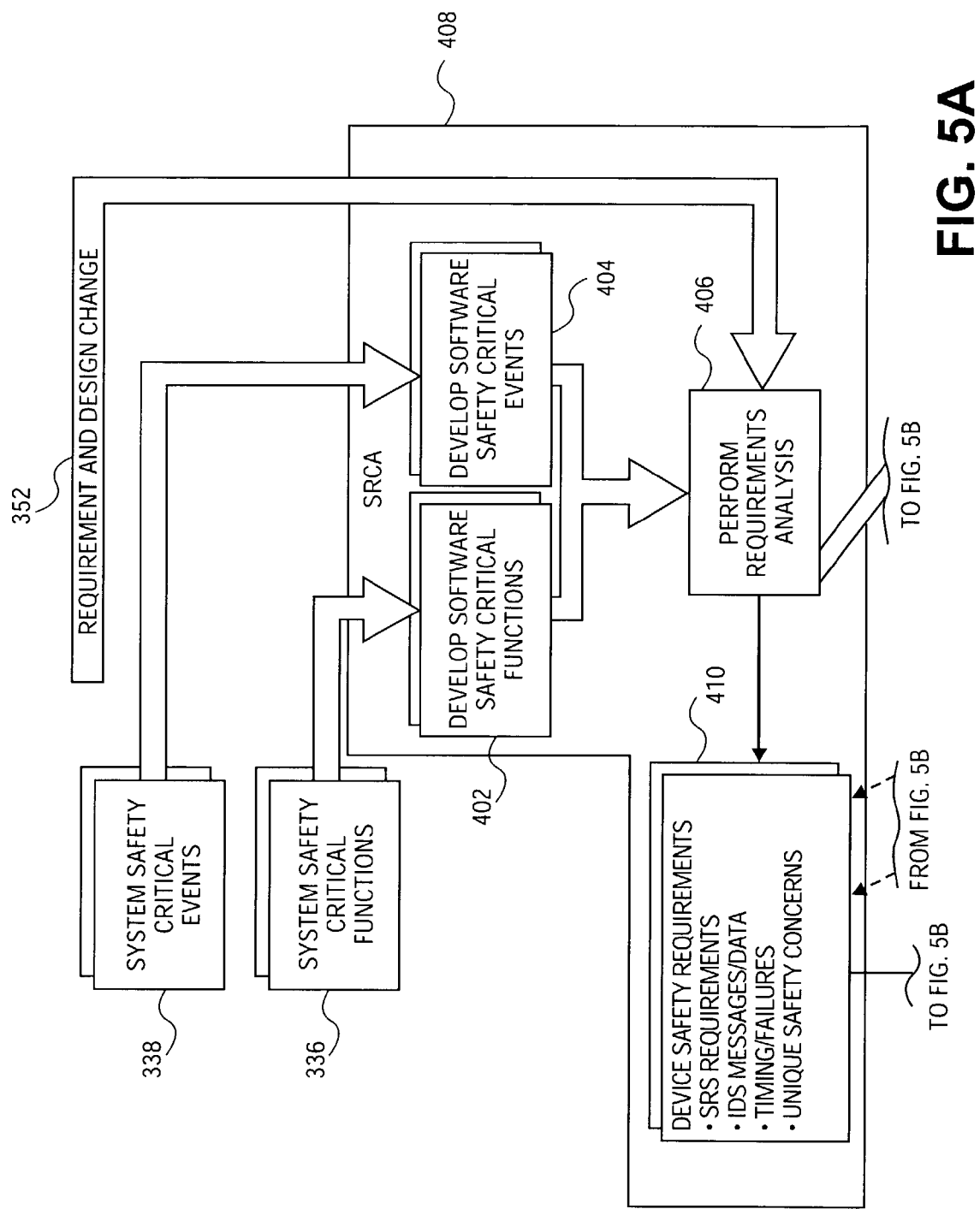
FIGS. 5A and 5B are diagrams showing the Rigor Level Two software analysis of FIG. 3A in more detail, according to an embodiment of the invention.
Figure 5B:
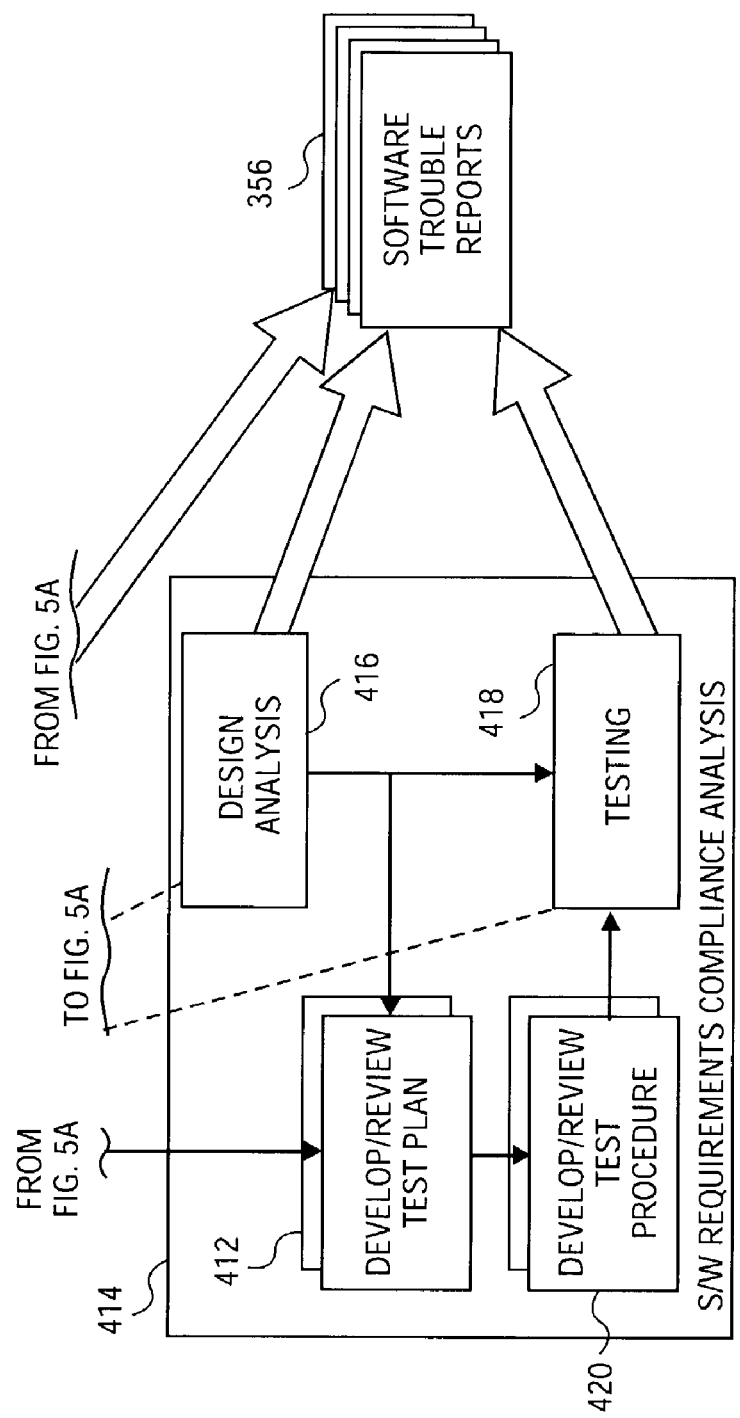

FIGS. 5A and 5B show the Rigor Level Two software analysis 346 of FIG. 3A in detail, according to an embodiment of the invention. The description of FIGS. 5A and 5B is provided as if these two figures made up one large figure. Therefore, some components indicated by reference numerals reside only in FIG. 5A, whereas other components indicated by reference numerals reside only in FIG. 5B.

The system safety critical events 338 are used to develop software safety critical events 404 in the SRCA 408, whereas the system safety critical functions 336 are used to develop software safety critical functions 402 in the SRCA 408. The functions 402 and the events 404, along with the requirements and design changes 352, are used to perform a requirements analysis 406. The requirements analysis 406 leads to device safety requirements 410, including SRS requirements, IDS messages and data, timing and failures, and unique safety concerns.

The device safety requirements 410 are used to develop or review a test plan 412, which is part of a software requirements compliance analysis 414. A design analysis 416 also affects the test plan 412, and the design analysis 416 additionally affects the device safety requirements 410. The design analysis 416 affects testing 418, which itself affects the device safety requirements 410. After development and review of the test plan 412, test procedures 420 are developed and reviewed, on which basis the testing 418 is accomplished. The testing 418, along with the design analysis 416, also affect the software trouble reports 356.

Figure 6:
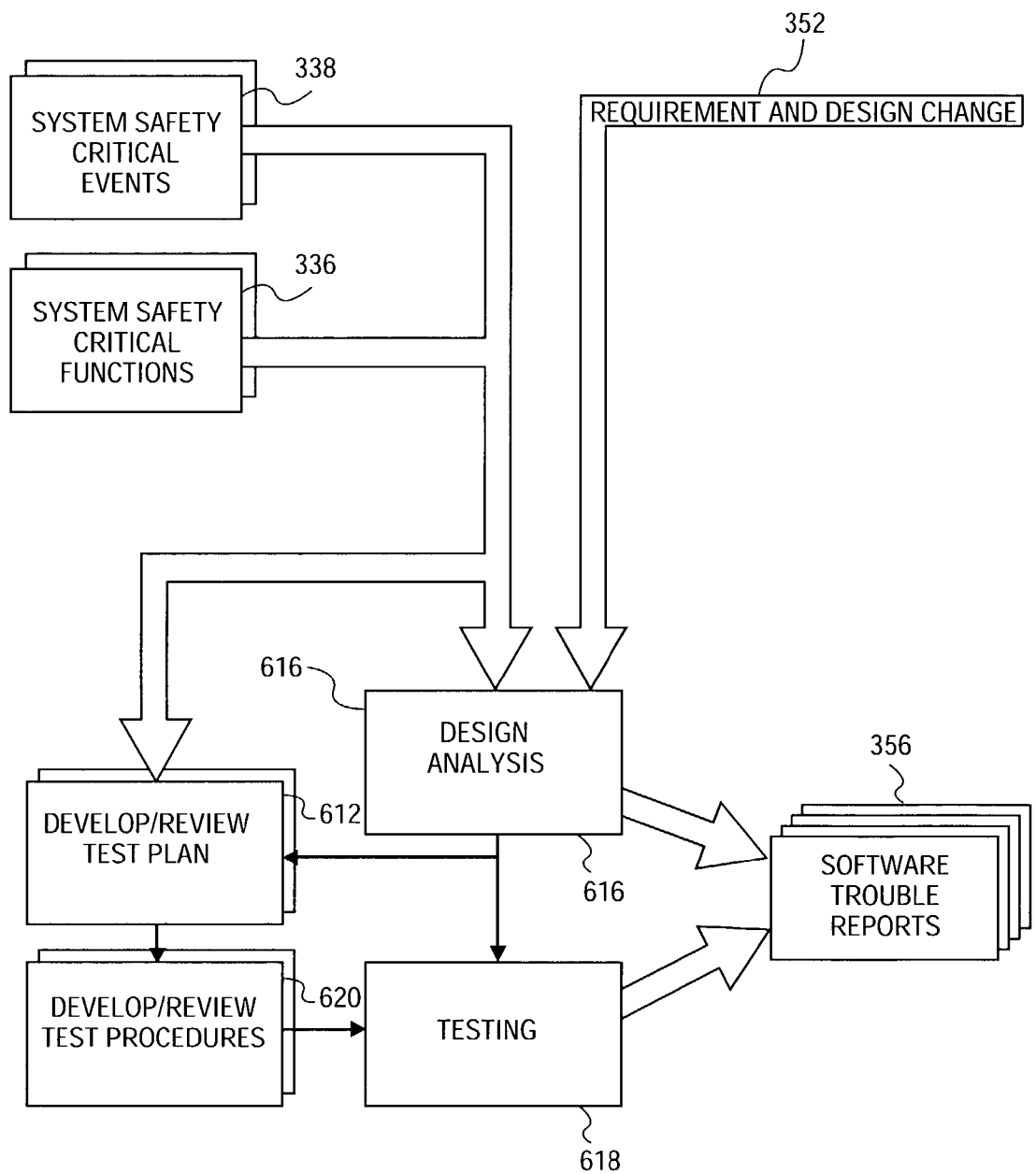
FIG. 6 is a diagram showing the Rigor Level Three software analysis of FIG. 3A in more detail, according to an embodiment of the invention.

FIG. 6 shows the Rigor Level Three software analysis 348 of FIG. 3A in detail, according to an embodiment of the invention. The system safety critical events 338, the system safety critical functions 336, and the requirements and design changes 352, are used to conduct a design analysis 616. The design analysis 616, along with the events 338 and the functions 336, are used to develop and review a test plan 612, from which test procedures 620 are developed and reviewed. On the basis of the test procedures 620, and the design analysis 616, testing 618 is accomplished. The design analysis 616 and the testing 618 results in software trouble reports 356.

Figure 7:
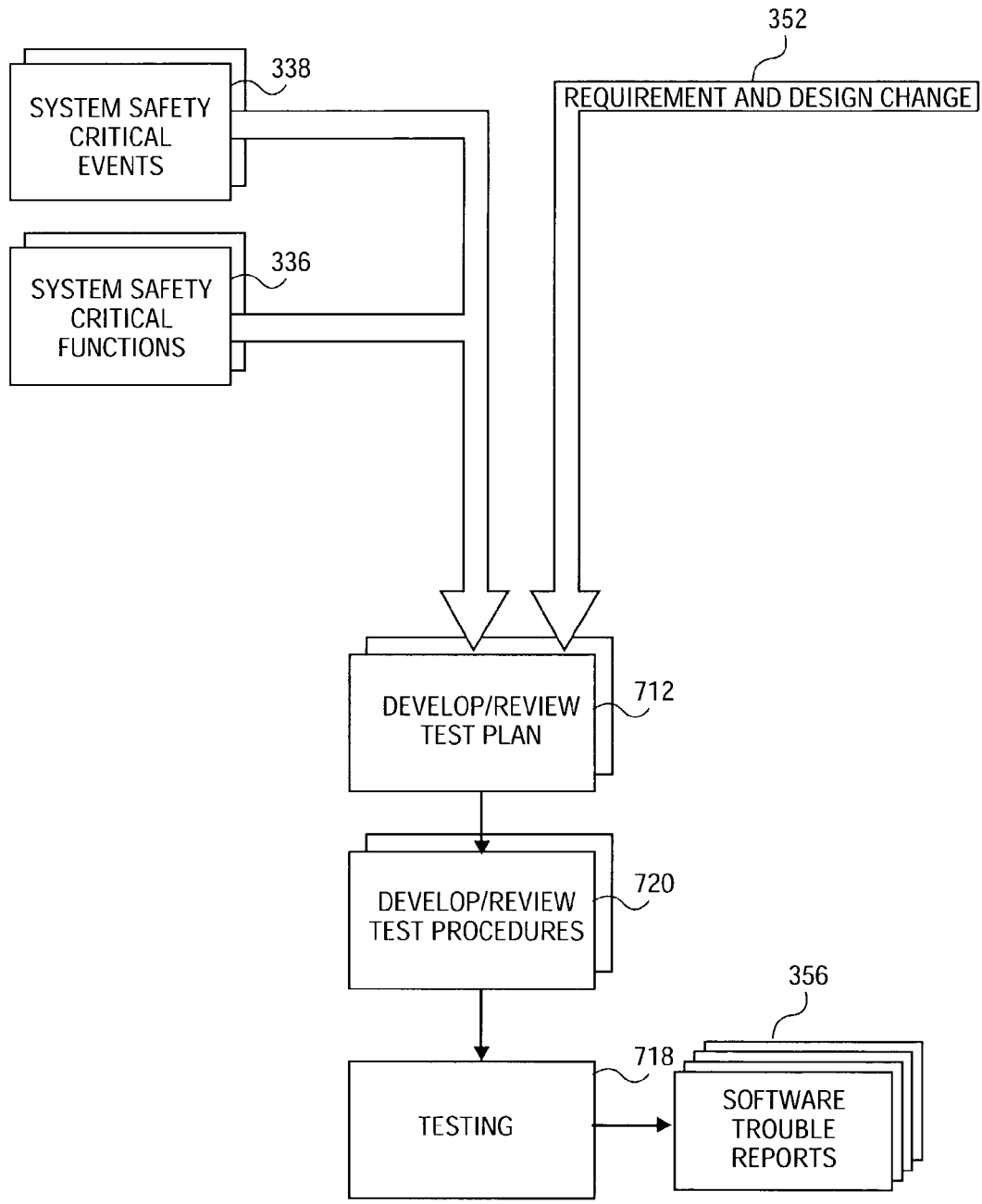
FIG. 7 is a diagram showing the Rigor Level Four software analysis of FIG. 3A in more detail, according to an embodiment of the invention.

FIG. 7 shows the Rigor Level Four software analysis 350 of FIG. 3A in detail, according to an embodiment of the invention. The system safety critical events 338, the system safety critical functions 336, and the requirements and design changes 352, are used to develop and review a test plan 712, from which test procedures 720 are developed and reviewed. On the basis of the test procedures 720, testing 718 is accomplished. The testing 718 results in software trouble reports 356.

FIGS. 8A–8G show the safety disposition phase 106 of FIG. 1A and the sustained system safety engineering (sustenance) phase 108 of FIG. 1A in detail, according to an embodiment of the invention, and should be laid out as indicated in FIG. 1C. Starting first at FIG. 8E, the emphasized dotted line 802 separates the safety disposition phase 106 from the sustenance phase 108. The safety disposition phase 106 is to the left of the dotted line 802, whereas the sustenance phase 108 is to the right of the dotted line 802.

Still referring to FIG. 8E, in the safety disposition phase 106 to the left of the dotted line 802, the system HTD 318 is still maintained as part of the process 315. Similarly, the software HTD 317 is still maintained as part of the process 347, and the combat HTD is still maintained as part of the process 361. This is also the case in the sustenance disposition phase 108 to the right of the dotted line 802, as is shown in FIG. 8E.

Figure 8A:
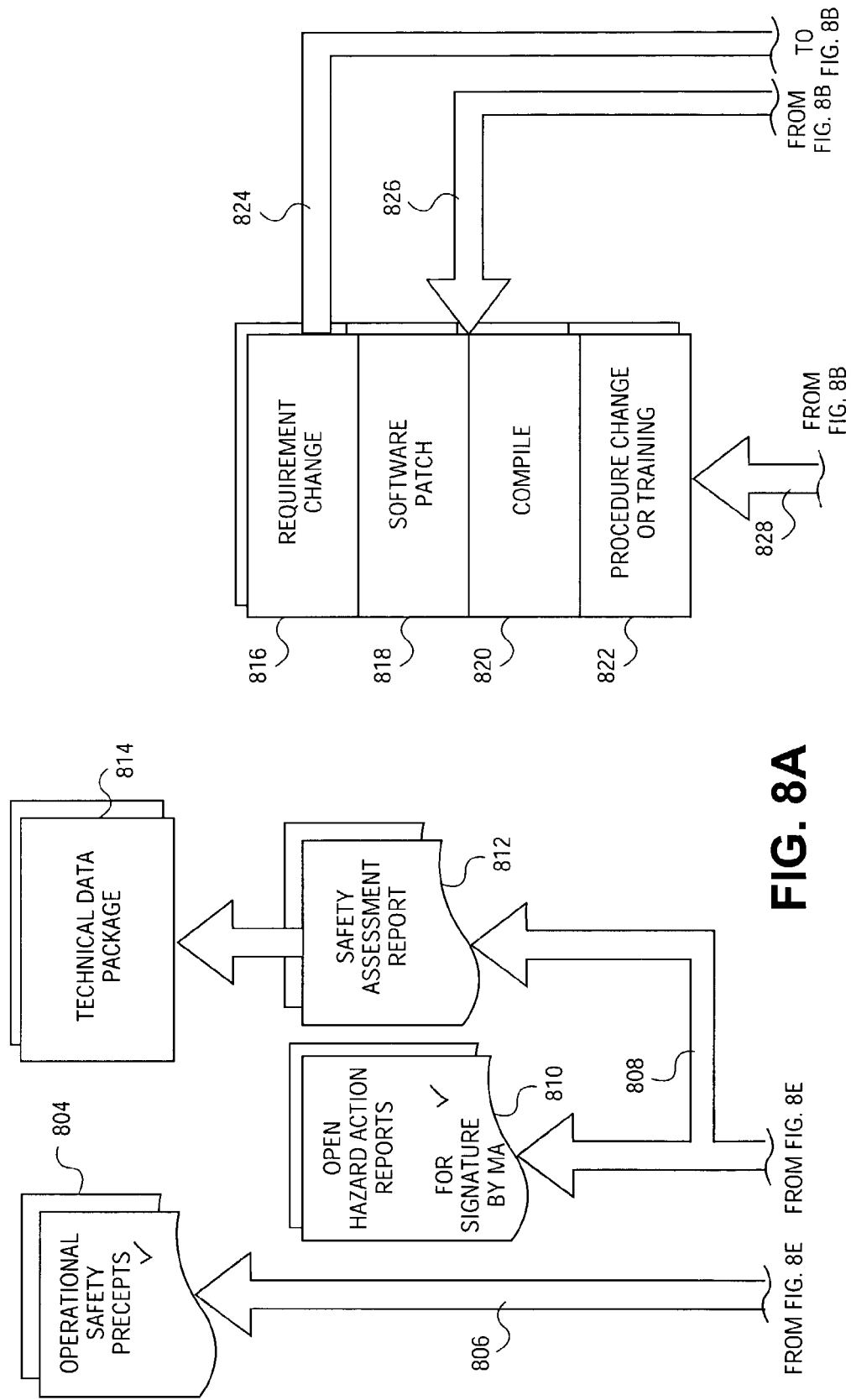

Referring next to FIG. 8A, operational safety precepts 804 result from the process 315 of FIG. 8E, as indicated by the arrow 806. The following are examples of operational safety precepts. No electrical power shall be applied to a weapon without intent to initiate. There shall be no mixing of simulators and tactical rounds within a launcher. There shall be no intermixing of development or non-developmental weapons, ordnance, programs, or control systems with tactical systems without documented specific approval. The system shall be operated and maintained only by trained personnel using authorized procedures. Front-end radar simulation or stimulation shall not be permitted while operating in a tactical mode.

Still referring to FIG. 8A, open hazard action reports 810, for signature by the Managing Activity (MA), result from the maintenance of the system HTD 318 of FIG. 8E, as indicated by the arrow 808. Also resulting from the maintenance of the system HTD 318 of FIG. 8E, as indicated by the arrow 808, is a Safety Assessment Report (SAR) 812. The safety assessment report 812 itself results in the generation of a technical data package 814.

Still referring to FIG. 8A, requirement changes 816, software patches 818, compiles 820, and procedure changes or training 822 can result from the arrows 826 and 828. The arrow 826 is from the interface working group 390 of FIG. 8B, whereas the arrow 828 is from the software change control board 388 of FIG. 8B. Furthermore, the requirement changes 816, software patches 818, compiles 820, and procedure changes or training 822, are verified as indicated as the verification 830 of FIG. 8B, as pointed to by the arrow 824.

Figure 8B:
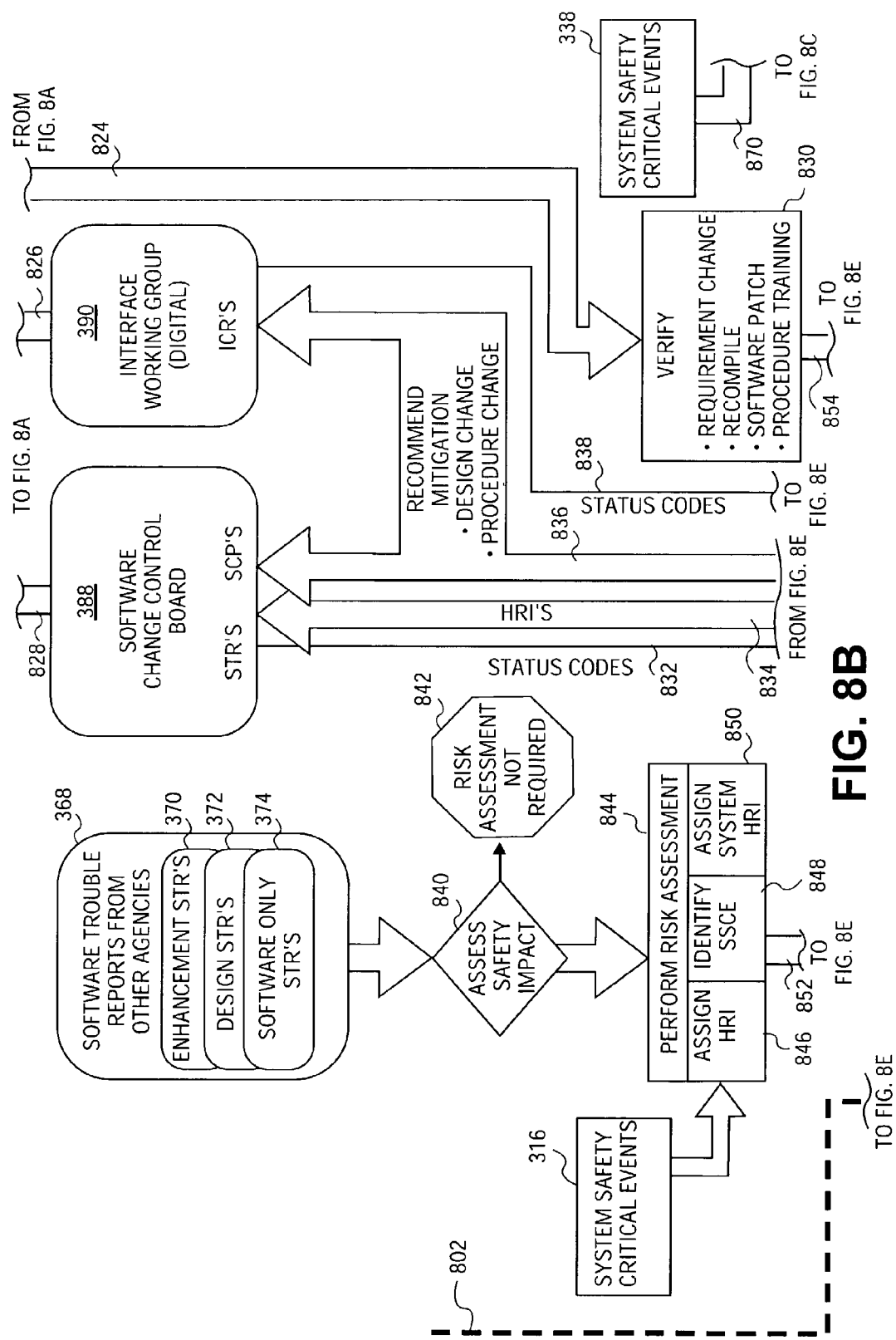

Referring now to FIG. 8B, the verification 830 enters the process 347 of FIG. 8E as indicated by the arrow 854. The software change control board 388 considers STR's and SCP's from the HRI's 834, and the recommended mitigations 836, which can be design changes and procedure changes. The HRI's 834 and the recommended mitigations 836 result from the maintenance of the software HTD 317 in FIG. 8E. As feedback the board 388 generates status codes 832. The interface working group (digital) considers ICR's based on the recommended mitigations 836, and generates status codes 838. STR's from other agencies 368, such as enhancement STR's 370, design STR's 372, and software-only STR's 374, are used to assess the safety impact 840, which can indicate that a risk assessment is not required, as indicated by the box 842. If a risk assessment 844 is required, however, then the system safety critical events 316 are used to assign HRI's 846, identify SSCE's 848, and assign system HRI's 850. These are then fed into the process 347, and thus the processes 315 and 361, of FIG. 8E, as indicated by the arrow 852.

Figure 8C:
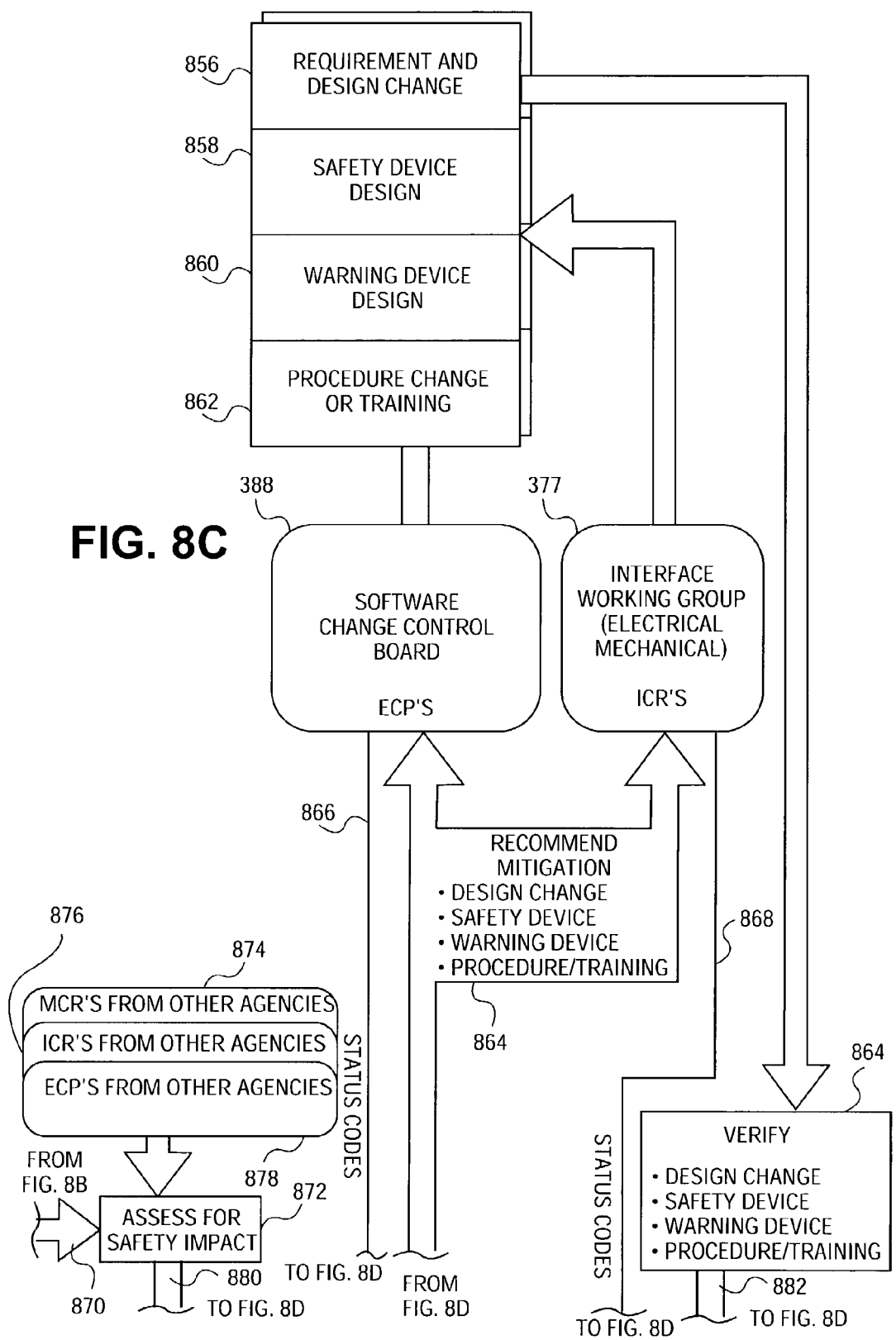

Referring next to FIG. 8C, requirement and design changes 856, safety device designs 858, working device designs 860, and procedure changes or training 862 are verified as indicated by the verification 864, and are generated by the software change control board 388 and the interface working group (electrical mechanical) 377. The software change control board 388 considers ECP's based on the recommendation mitigations 864, and the working group 377 considers ICR's based on the recommendation mitigations 864. The recommended mitigations 864 can include design changes, safety device additions, warning device additions, and changes in procedures and/or training. The board 388 provides status codes 866, whereas the working group 377 provides status codes 868. Furthermore, system safety critical events 338 from FIG. 8B, as indicated by the arrow 870, are used to make a safety impact assessment 872. The assessment 872 is also based on ICR's from other agencies 876 and ECP's from other agencies 878.

Figure 8D:
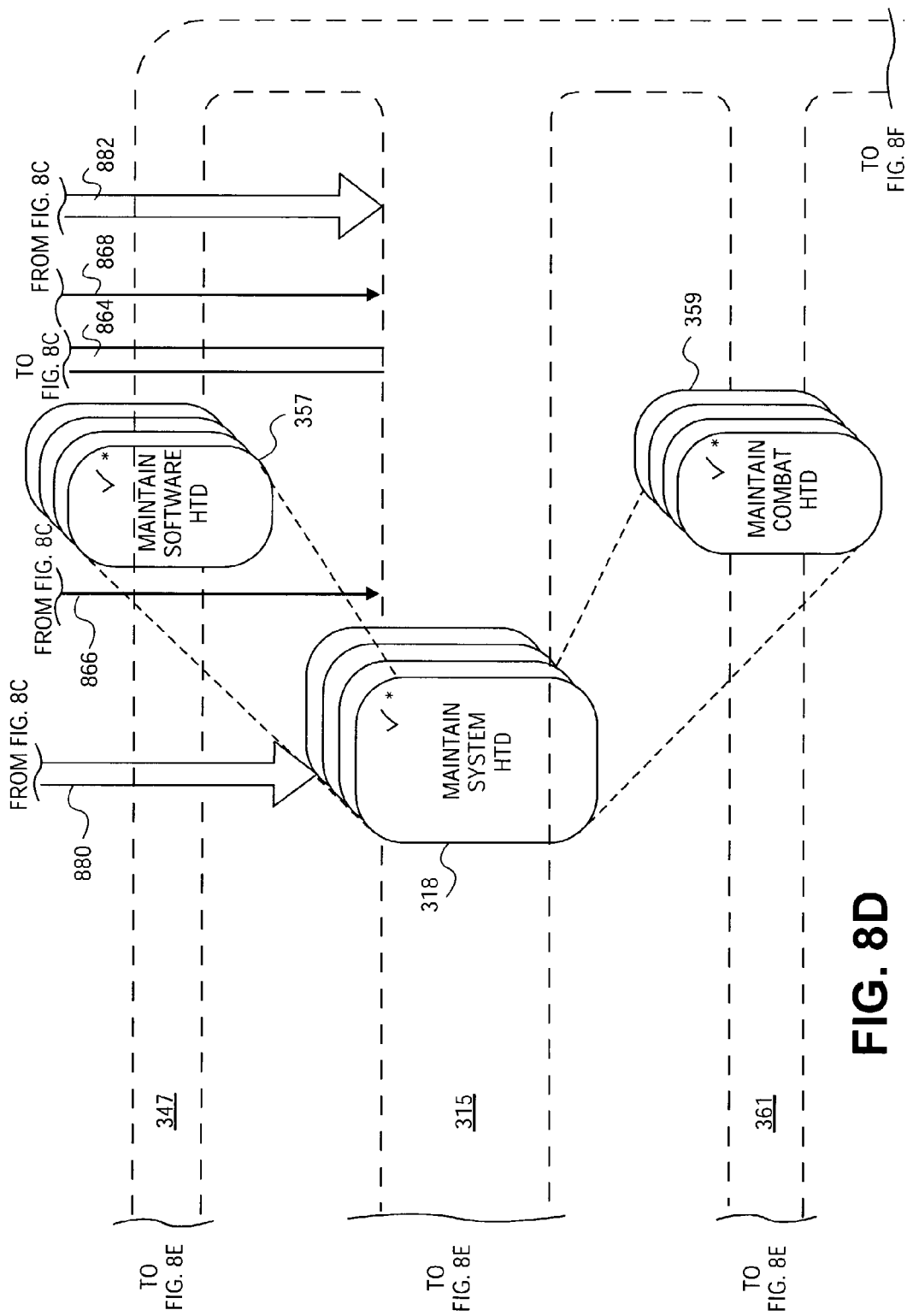

Referring next to FIG. 8D, further system HTD maintenance 318, software HTD maintenance 357, and combat HTD maintenance 359 is accomplished. The maintenance of the system HTD is based on the safety impact assessment 872 of FIG. 8C, as indicated by the arrow 880. The process 315 is influenced by the status codes 866. The process 315 also results in the recommended mitigations 864 of FIG. 8C, and is influenced by the status codes 868 and the verification 864 of FIG. 8C. As shown in the far right side of FIG. 8D, the processes 347, 315, and 361 are influenced by and influence one another, as they ultimately merged with one another.

Figure 8F:
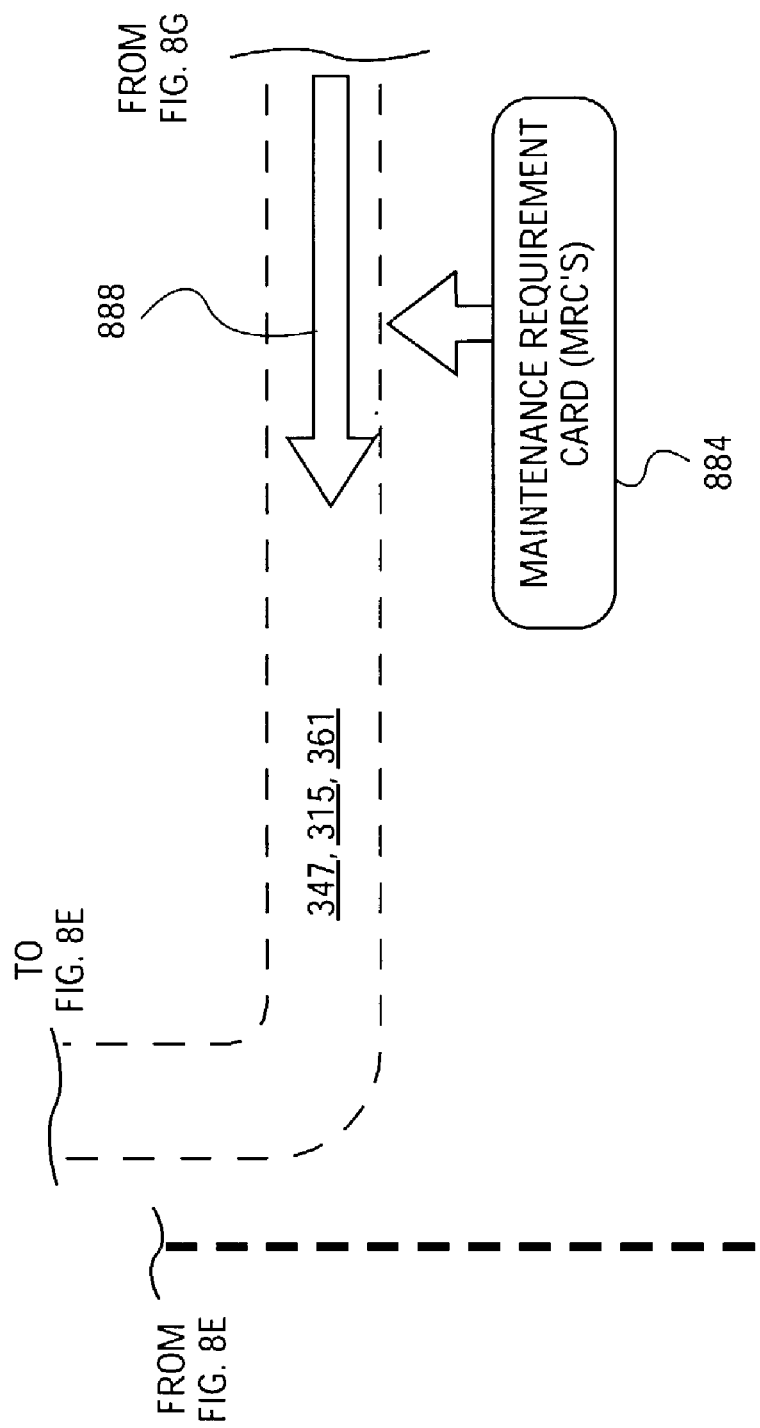
Figure 8G:
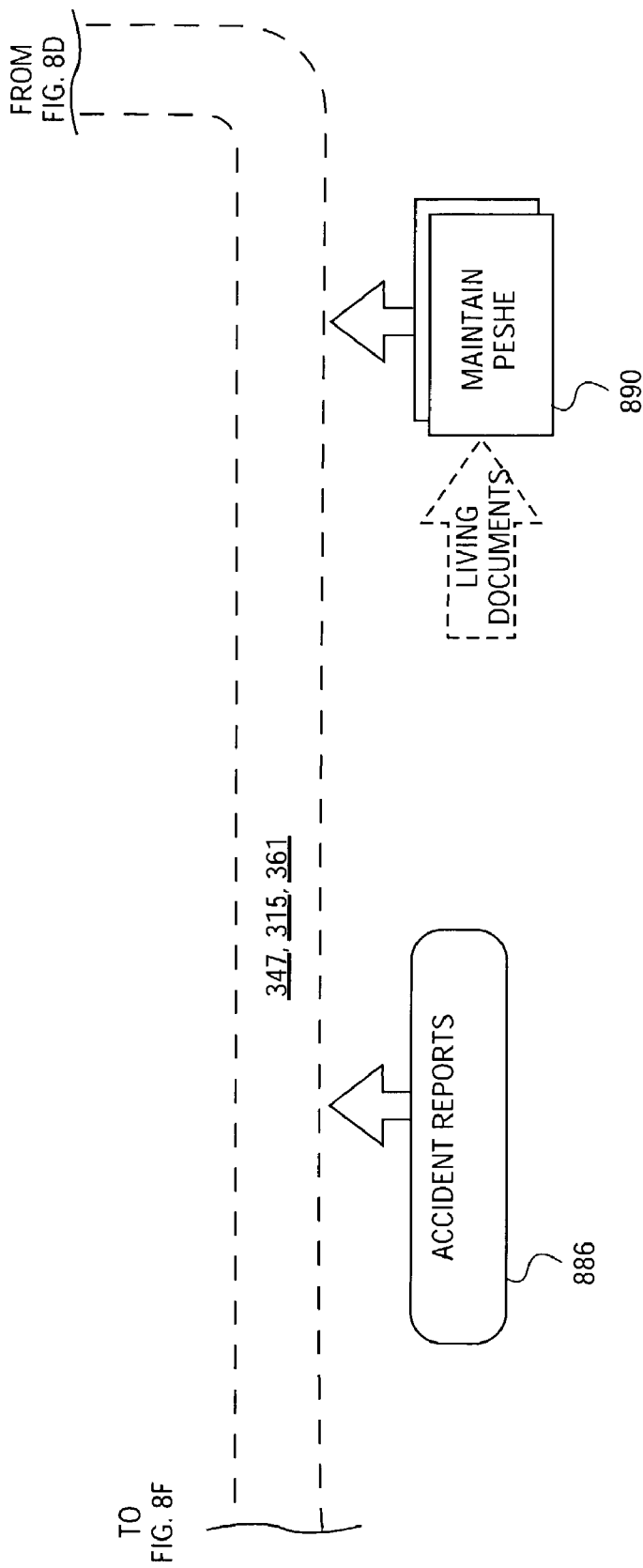

Referring next and finally to FIGS. 8F and 8G, Maintenance Requirement Cards (MRC's) 884 in FIG. 8F and accident reports 886 in FIG. 8G affect the looping back of the combined processes 347, 315, and 361 from FIG. 8D (to the top of FIG. 8G) back to FIG. 8E (to the top of FIG. 8F), as indicated by the arrow 888 in FIG. 8F. Furthermore, the PESHE 890 affects the combined processes 347, 315, and 361, and is a living document.

Training Device

Figure 9:
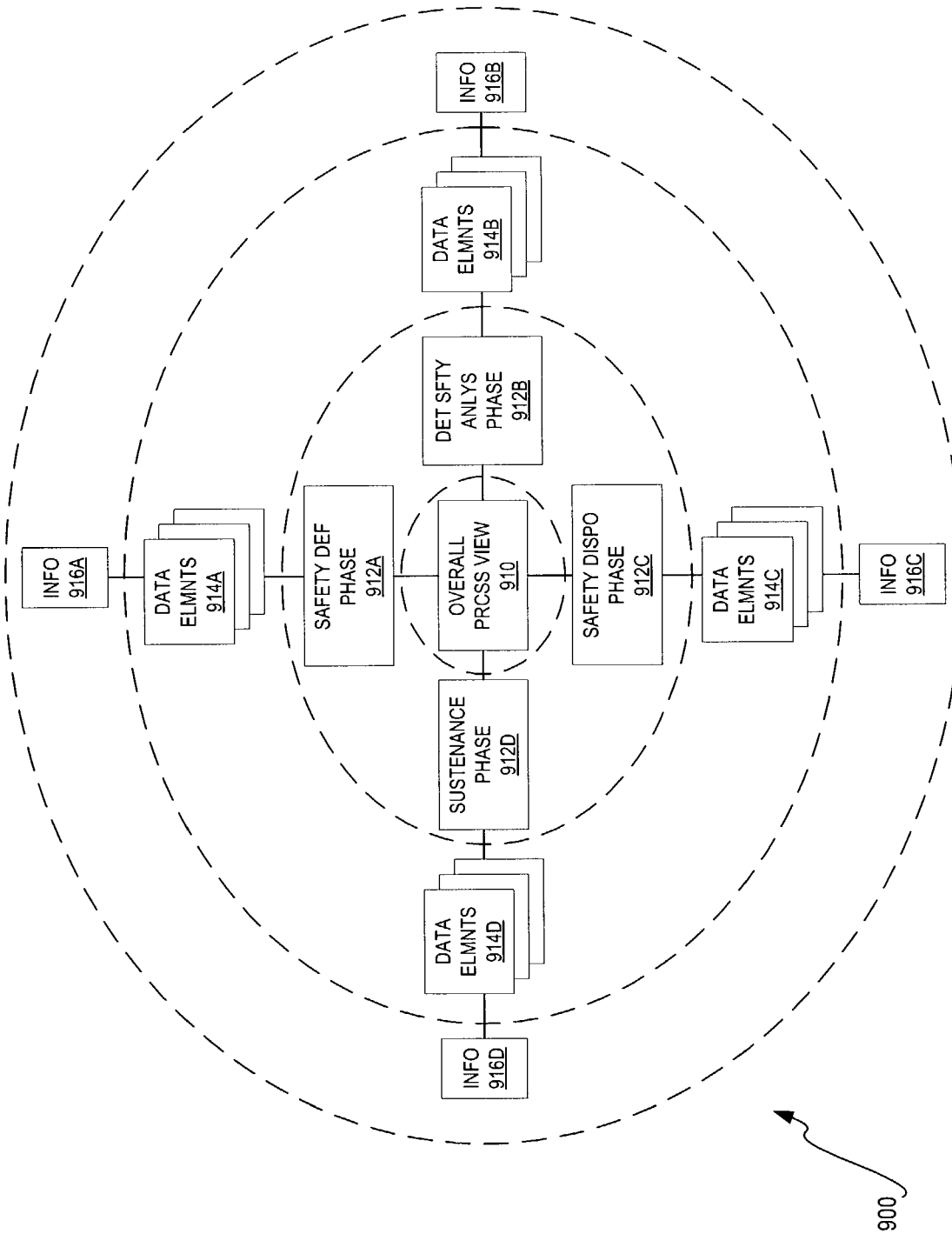
FIG. 9 is a diagram illustrating how a training device of an embodiment of the invention allows for the interaction with and the navigation of data representing the safety analysis process of the preceding figures.

A training device for the safety process allows a user to interact with and navigate the process without becoming overwhelmed by the entirety of the process. FIG. 9 shows a diagram 900 that illustrates the navigation process followed by the training device for the safety process, according to one embodiment of the invention. Navigation occurs among different areas 902, 904, 906, and 908. The user starts by viewing the overall safety process 910. For instance, the user may be able to view the integrated interoperable safety analysis process shown in and described in conjunction with FIG. 1A.

From viewing the safety process 910, the user has the ability to next view one of the phases 912A, 912B, 912C, and 912D. If the user selects the safety definition phase 912A, for instance, the user may view the safety program definition phase shown in and described in conjunction with FIGS. 2A and 2B. If the user selects the detailed safety analysis phase 912B, the user may view the detailed safety analysis phase shown in and described in conjunction with FIGS. 3A–3H. If the user selects the safety disposition phase 912C, the user may view the safety disposition phase shown in and described in conjunction with FIGS. 8A–8G. If the user selects the sustained system safety engineering, or sustenance, phase 912D, the user may view the sustained system safety engineering (sustenance) phase also shown in and described in conjunction with FIGS. 8A–8G.

Within each of the phases 912A, 912B, 912C, and 912D, the display of the phase includes a number of data elements represented as geometrical shapes. These data elements and geometrical shapes have already been described in detail in conjunction with FIGS. 2A–2B, 3A–3H, and 8A–8G. Thus, the phase 912A has the data elements 914A, the phase 912B has the data elements 914B, the phase 912C has the data elements 914C, and the phase 912D has the data elements 914D. Selecting one of the shapes, or data elements, within any of the phases 912A, 912B, 912C, and 912D causes further information to be displayed about that data element, indicated as the information 916A, 916B, 916C, and 916D, respectively, in FIG. 9. This information may include references, definition, examples, acronyms, and specifications regarding the selected data element, as has been particularly described in the previous section of the detailed description.

The user may navigate among the different areas 902, 904, 906, and 908 in a web browser-like fashion, especially in the embodiment of the invention where the training device is implemented as a web browser program, such as Microsoft Internet Explorer. Hence, the user may be able to navigate back to a previously viewed area from the currently viewed area. Hyperlinks may be present so that the user is always able to navigate to any of the phases 912A, 912B, 912C, and 912D, as well as to the overall "home" process view 910. A key hyperlink may display a legend showing the user what various geometrical shapes, lines, indicators, and so on, connotate. Finally, a work breakdown structure (WBS) link may display to the user a list of the data elements for the currently displayed phase, and the data items, or information, that can be displayed for those data items, as specifically described in the previous section of the detailed description.

Figure 10:
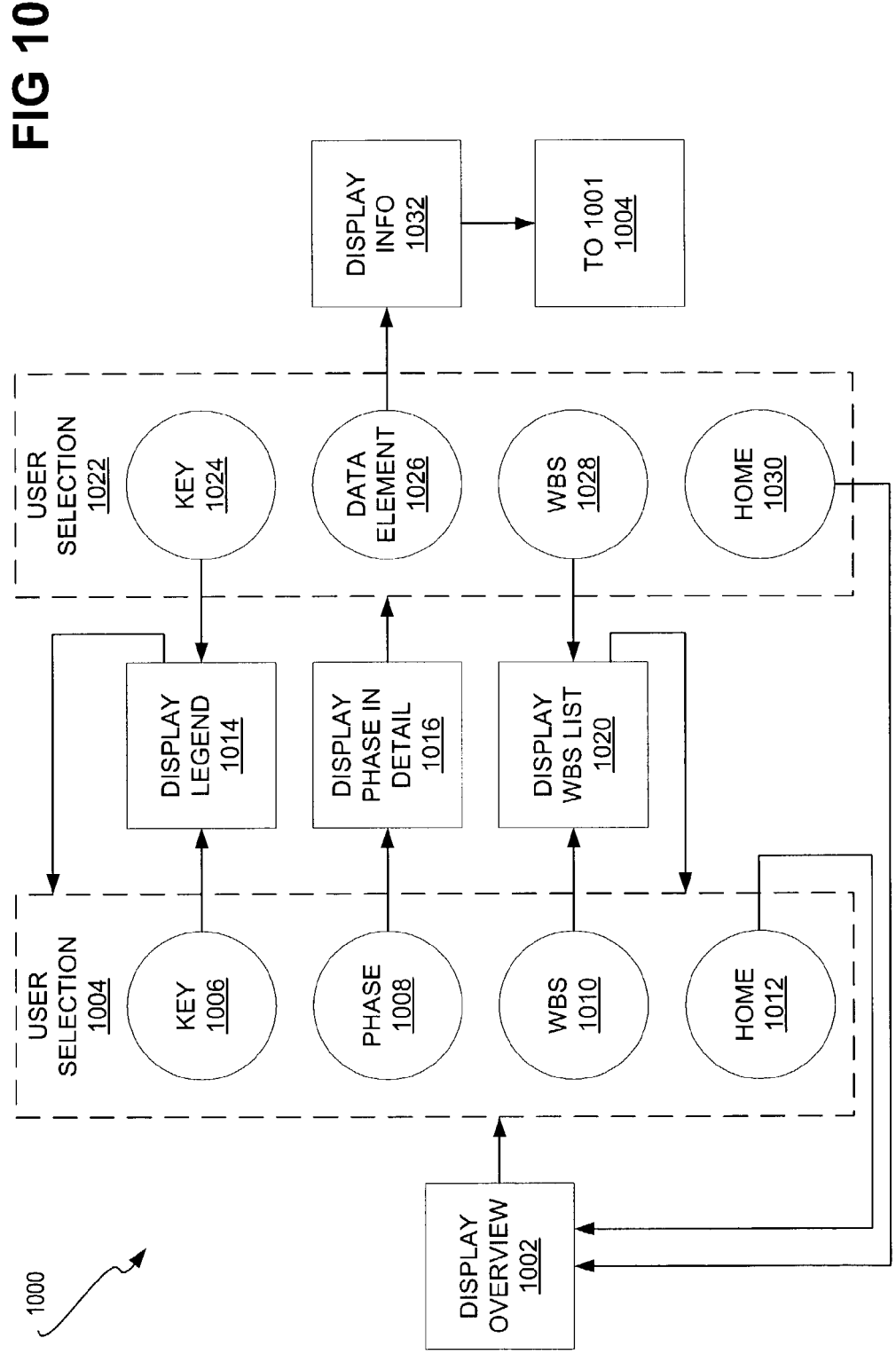
FIG. 10 is a flowchart of a method that can be implemented and/or followed by a training device of an embodiment of the invention to allow for interaction with and navigation of data representing the safety analysis process.

FIG. 10 thus outlines a method 1000 by which a user can navigate and interact with the safety process described in the previous section of the detailed description, according to an embodiment of the invention. The method 1000 may be implemented as a computer program stored on a computer-readable medium, such as an optical disc (e.g., a CD-ROM, a DVD-ROM, and so on). The various functionality of the method 1000 as will be described can then be implemented as various means of the computer program. Such means may include computer program objects, modules, components, sub-routines, and so on, as can be appreciated by those of ordinary skill within the art.

The overview is first displayed (1002). From the overview the user is able to make a selection indicated within the dotted-line box 1004. Thus, the user can select a key hyperlink (1006), select a particular phase (1008), select a WBS hyperlink (1010), or select the home hyperlink (1012). Selecting the key hyperlink (1006) displays the legend for the safety process (1014), from which the user is then able to make another selection (1004). Similarly, selecting the WBS hyperlink (1010) displays the list of data elements for the phases, and data items or information that can be displayed for these elements (1020), from which the user is also able to make another selection (1004). Selecting the home hyperlink (1012) redisplays the overview (1002), and the user can make another selection (1004).

The user can select a phase (1008) by clicking on the appropriate part of the overview displayed, when it is displayed, or by clicking on a hyperlink for the particular phase. This causes the selected phrase to be shown in detail (1016). From this specific phase detail, the user has the ability to make the selections shown in the dotted-line box 1022. As before, for instance, the user is able to select the key (1024), select the WBS (1028), or select the home view (1030), which causes associated actions as have been described. In addition, the user can also select one of the data elements shown for the currently displayed phase (1026). This causes information, or the data items, regarding the selected data element to be displayed (1032). The user then is able to make another selection as indicated in the dotted-line box (1034), as has been described.

In other words, the safety process of the preceding section of the detailed description is hierarchically displayed, where only a portion of the detail of the process is shown at any one time. Thus, the user sees an overview of the process, and can then "drill down" to view more information about any specific phase, and more information about any specific data element of any specific phase. In one embodiment, as has been described, this is accomplished by using a web browser program. The information regarding the safety process is stored as web browser program-readable and accessible data, such as mark-up language (HTML, and so on) data. Thus, commercial off-the-shelf (COTS) pre-packaged software is used to bind the logical algorithms and links into a coherent flow, which facilitates the training and implementation process.

Figure 11:
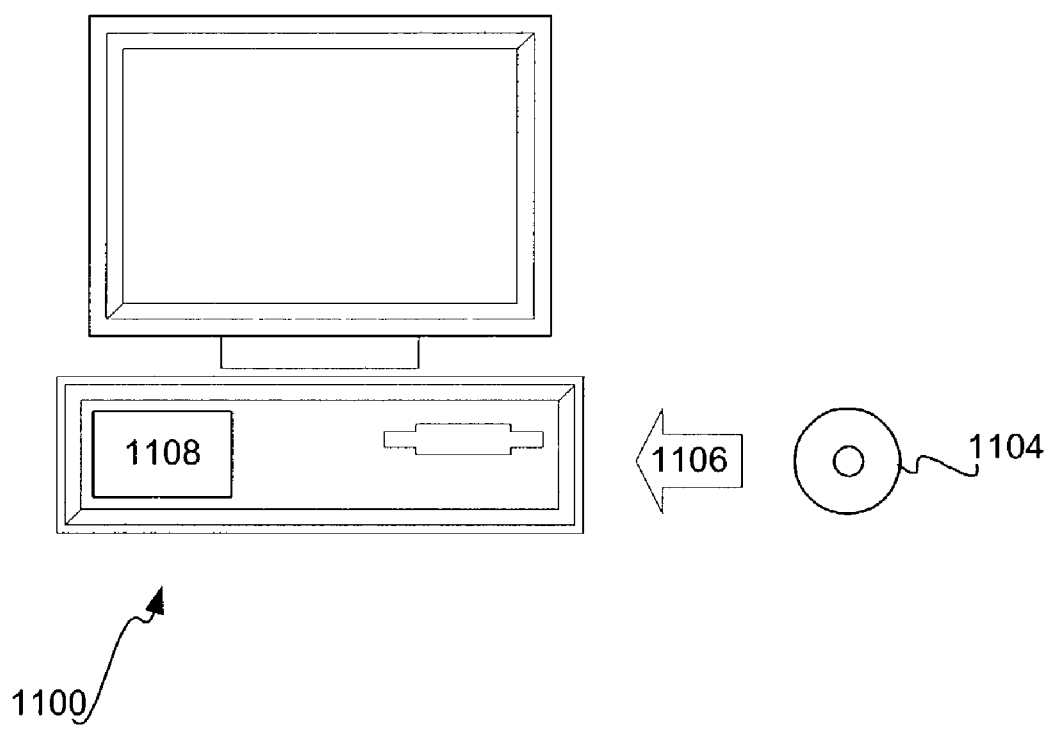
FIG. 11 is a diagram of a system allowing for single-user access of a training device for the safety analysis process, according to an embodiment of the invention.

Furthermore, the invention is portable and may be accessible individually via CDROM, or other optical disc or computer-readable medium, or may be web-hosted and accessed simultaneously by multiple users via a web browser program, such as one with JavaScript support. For example, FIG. 11 shows a system 1100 for an individual installation and use of the training device, according to an embodiment of the invention. A computer 1102 may be a desktop computer, a laptop computer, or another type of computing device. It includes an interactive and navigation component 1104, such as a web browser program, controllable by a user to negative the safety analysis process. The data representing the safety analysis process is stored on a computer-readable medium 1104, such as an optical disc, that is inserted into the computer 1102. The data may be directly accessed from the medium 1104 into the computer 1102, or copied to a local storage of the computer 1102, such as a hard disk drive.

Figure 12:
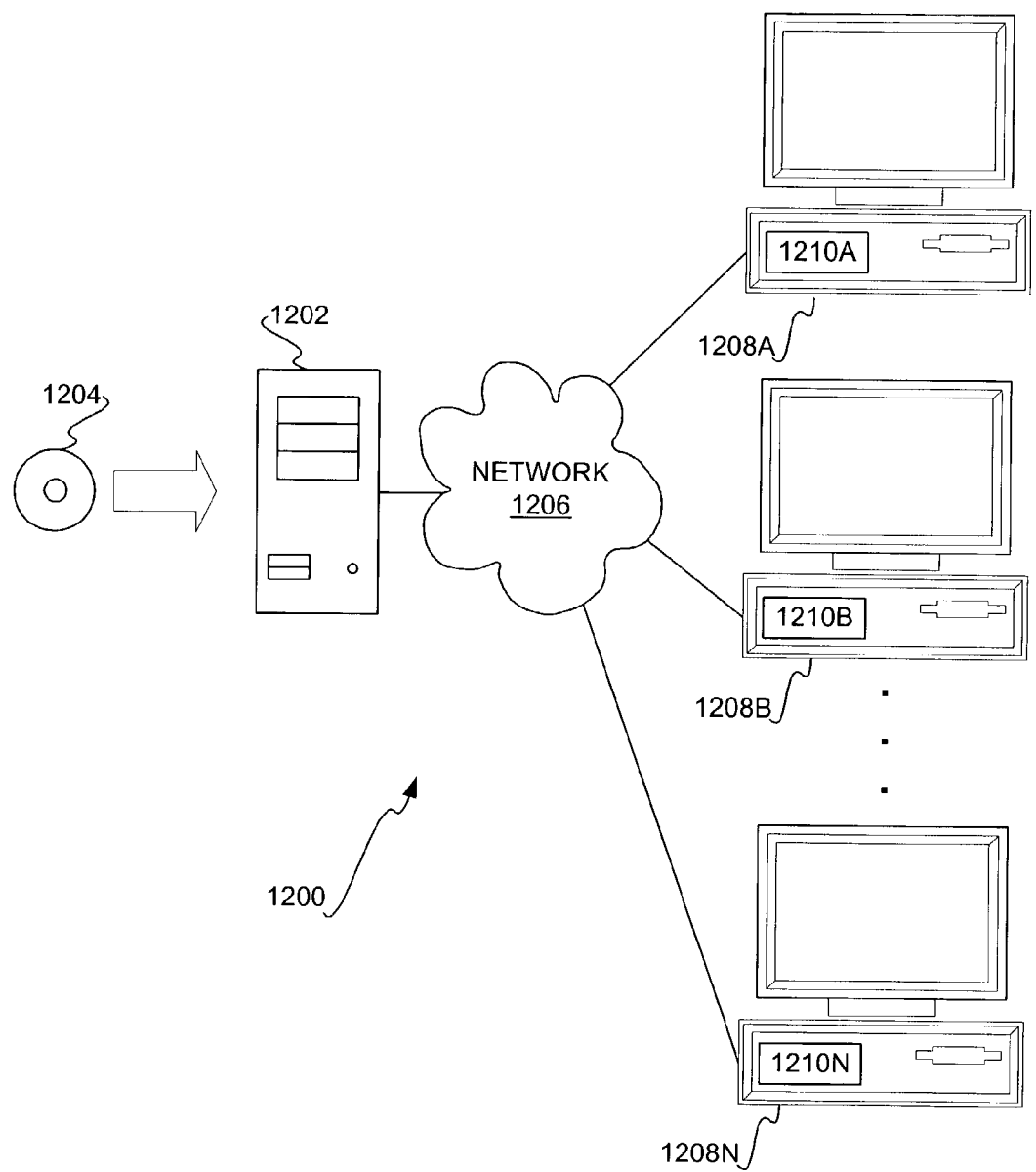
FIG. 12 is a diagram of a system allowing for simultaneous multiple-user access of a training device for the safety analysis processing, according to an embodiment of the invention.

By comparison, FIG. 12 shows a system 1200 for multi-user use of the training device, according to an embodiment of the invention. A server 1202 is a computer or another type of computing device, into which a computer-readable medium 1204 storing data representing the safety analysis process is inserted. The data is accessed from the medium 1204 directly, or copied to a local storage of the server 1202. The server 1202 is communicatively coupled to a network 1206, to which a number of client devices 1208A, 1208B, . . . 1208N are also communicatively coupled. Each of these devices can be a computer, such as a desktop or a laptop computer, or another type of computing device. The devices have associated interactive and navigation components 1210A, 1210B, . . . , 121 ON by which they can access the data representing the safety analysis process over the network 1206 from the server 1202. In this way, multiple users can use the training device simultaneously.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. For instance, whereas the invention has been substantially described in relation to a naval combat system, it is applicable to other types of military and non-military systems as well. Therefore, it is manifestly intended that this invention be limited only by the claims and equivalents thereof.

What is claimed is:

1. A method for displaying a safety analysis process to a user, the method comprising:

initially displaying an interface and navigation overview of the safety analysis process having a safety definition phase, a detailed safety analysis phase, a safety disposition phase, and a sustained system safety engineering phase;

receiving a process selection from the user for a particular portion;

displaying in detail the particular portion in response to the process selection, the particular portion including a plurality of data elements of the particular portion of the process represented as geometric shapes;

receiving a data element selection from the user for a chosen data element of the plurality of data elements; and displaying information regarding the chosen data element in response to the data element selection, including at least one of references, definitions, examples, acronyms, and specifications regarding the data element selected.

2. The method of claim 1, further comprising, in response to the user selecting a key item, displaying a legend regarding the safety analysis process.

3. The method of claim 1, further comprising, in response to the user selecting a home item, re-displaying the overview of the safety analysis process.

4. The method of claim 1, further comprising, in response to the user selecting a work breakdown structure item, displaying a list of data elements for the portions of the safety analysis process, including information regarding each of the data elements of the list, including at least one of references, definition, examples, acronyms, and specifications.

5. The method of claim 1, wherein the method is implemented for interaction with and for navigation by the user within a web browser computer program.

6. The method of claim 1, wherein the method is implemented on an optical disc for individual access by the user.

7. The method of claim 1, wherein the method is implemented on a server for simultaneous access by a plurality of users including the user.

8. A system for displaying a safety analysis process to a user, the system comprising:

a computer-readable medium having stored thereon data representing the safety analysis process having a safety definition phase, a detailed safety analysis phase, a safety disposition phase, and a sustained system safety engineering phase, including a plurality of data elements regarding each phase of the process, and information regarding each of the plurality of data elements regarding each phase of the process; and, an interactive and navigation component controllable by the user to navigate the safety analysis process as the data stored on the computer-readable medium, the interactive and navigation component able to receive a process selection from the user for a particular portion and to display an overview of the process to the user, the interactive and navigation component displaying successively different particular portions of the process for more in-depth viewing thereof and the plurality of data elements regarding the portions in response to a particular portion selection from the user, and the interactive and navigation component displaying successively different data elements of the particular portions for more in-depth viewing thereof and for viewing the information regarding the data elements in response from the user to a chosen data element selection of the plurality of data elements.

9. The system of claim 8, wherein the interactive and navigation component further is controllable by the user so that the user is able to select a key item to view a legend regarding the safety analysis process.

10. The system of claim 8, wherein the interactive and navigation component further is controllable by the user so that the user is able to select a home item to view again the overview of the safety analysis process.

11. The system of claim 8, wherein the interactive and navigation component further is controllable by the user so that the user is able to select a work breakdown structure item so that the user is able to view a list of data elements for the portions of the safety analysis process.

12. The system of claim 8, wherein the interactive and navigation component comprises a web browser computer program.

13. The system of claim 8, wherein the computer-readable medium comprises an optical disc for individual access to the process by the user.

14. The system of claim 8, wherein the computer-readable medium is stored on a server for simultaneous access to the process by a plurality of users including the users.

15. A computer-readable medium having a computer program stored thereon for displaying a safety analysis process to a user, the medium comprising:

means for initially displaying an interface and navigation overview of a safety analysis process having a safety definition phase, a detailed safety analysis phase, a safety disposition phase, and a sustained system safety engineering phase;

means for receiving a process selection from the user for a particular portion;

receiving a data element selection from the user for a chosen data element of the plurality of data elements;

means for displaying in detail the particular portion in response to the process selection, the particular portion including a plurality of data elements of the particular portion of the process represented as geometric shapes;

means for accessing a database a data element selection from the user for a chosen data element of the plurality of data elements; and means for displaying information regarding the chosen data element in response to the data element selection, including at least one of references, definitions, examples, acronyms, and specifications regarding the data element selected.

16. The medium of claim 15, further comprising means for displaying, in response to the user selecting a key item, a legend regarding the safety analysis process.

17. The medium of claim 15, further comprising means for displaying, in response to the user selecting a work breakdown structure item, a list of data elements for the portions of the safety analysis process, including information regarding each of the data elements of the list, including at least one of references, definition, examples, acronyms, and specifications.

18. The medium of claim 15, wherein the computer program comprises a web browser computer program accessing data representing the process.

19. The medium of claim 15, wherein the medium is an optical disc for individual access by the user.

20. The medium of claim 15, wherein the medium is located at a server for simultaneous access by a plurality of users including the user.

21. The method of claim 1, wherein the method further comprises generating a system safety management plan, and an agency system safety program plan.

22. The method of claim 1, wherein the method further comprises establishing and maintaining a system hazard tracking database.

23. The method of claim 1, wherein the method further comprises performing a criticality analysis on software subsystem hazard from which to produce a software trouble report.

24. The method of claim 1, wherein the method further comprises creating a software requirements criteria analysis based on a first list of system safety critical events and a second list of system safety critical functions.

25. The system of claim 8, wherein the computer-readable medium further includes instructions for generating a system safety management plan, and an agency system safety program plan.

26. The system of claim 8, wherein the computer-readable medium further includes instructions for establishing and maintaining a system hazard tracking database.

27. The medium of claim 15, wherein the medium further comprises means for generating a system safety management plan, and an agency system safety program plan.

28. The medium of claim 15, wherein the medium further comprises means for establishing and maintaining a system hazard tracking database.

29. The method of claim 1, wherein the geometric shapes designate a rounded box for an input, a rectangular box for a product, an asterisk for a safety design review and a check-mark for an engineering review.

30. The method of claim 1, further comprising:
receiving technical direction and budget inputs and a statement of work for the safety definition phase;
producing a safety management plan based on the inputs; and
maintaining a system safety critical event record to track hazards for the detailed safety analysis, safety disposition and sustained system safety engineering phases.

31. The system of claim 8, wherein the geometric shapes designate a rounded box for an input, a rectangular box for a product, an asterisk for a safety design review and a check-mark for an engineering review.

32. The system of claim 8, further comprising:
receiving technical direction and budget inputs and a statement of work for the safety definition phase;
producing a safety management plan based on the inputs; and
maintaining a system safety critical event record to track hazards for the detailed safety analysis, safety disposition and sustained system safety engineering phases.

33. The medium of claim 15, wherein the geometric shapes designate a rounded box for an input, a rectangular box for a product, an asterisk for a safety design review and a check-mark for an engineering review.

34. The medium of claim 15, further comprising:
receiving technical direction and budget inputs and a statement of work for the safety definition phase;
producing a safety management plan based on the inputs; and
maintaining a system safety critical event record to track hazards for the detailed safety analysis, safety disposition and sustained system safety engineering phases.

* * * * *